(12) United States Patent
Abrahamsen

(10) Patent No.: US 10,108,172 B2
(45) Date of Patent: Oct. 23, 2018

(54) SPIRAL TOOLPATHS FOR HIGH-SPEED MACHINING OF POLYGONAL POCKETS

(71) Applicant: Autodesk, Inc., San Rafael, CA (US)

(72) Inventor: Mikkel Abrahamsen, Copenhagen (DK)

(73) Assignee: AUTODESK, INC., San Rafael, CA (US)

( * ) Notice: Subject to any disclaimer, the term of this patent is extended or adjusted under 35 U.S.C. 154(b) by 432 days.

(21) Appl. No.: 14/882,181

(22) Filed: Oct. 13, 2015

(65) Prior Publication Data

US 2016/0101474 A1    Apr. 14, 2016

Related U.S. Application Data

(60) Provisional application No. 62/063,283, filed on Oct. 13, 2014.

(51) Int. Cl.
*G05B 19/19* (2006.01)
*G05B 19/4097* (2006.01)

(52) U.S. Cl.
CPC ......... *G05B 19/19* (2013.01); *G05B 19/4097* (2013.01); *G05B 2219/45145* (2013.01)

(58) Field of Classification Search
CPC .................................................... G05B 19/19
USPC ........................................................ 700/160
See application file for complete search history.

(56) References Cited

U.S. PATENT DOCUMENTS

| | | | | |
|---|---|---|---|---|
| 4,939,646 | A * | 7/1990 | Essinger | G06F 17/175 378/901 |
| 5,506,784 | A * | 4/1996 | Tsonis | D05B 19/08 112/475.19 |
| 2012/0221140 | A1* | 8/2012 | Berman | G05B 19/4093 700/187 |
| 2012/0330620 | A1* | 12/2012 | Sullivan | G05B 19/4069 703/1 |

OTHER PUBLICATIONS

A. Fournier and D. Y. Montuno. 1984. Triangulating Simple Polygons and Equivalent Problems. ACM Trans. Graph. 3, 2 (Apr. 1984), 153-174.*
N. Mayya and V. T. Rajan, "Voronoi diagrams of polygons: A framework for shape representation," 1994 Proceedings of IEEE Conference on Computer Vision and Pattern Recognition, Seattle, WA, 1994, pp. 638-643.*

(Continued)

*Primary Examiner* — James D. Rutten
(74) *Attorney, Agent, or Firm* — Gates & Cooper LLP

(57) ABSTRACT

A method, apparatus, and computer program product provide the ability to construct a spiral toolpath for machining solid material. A polygon with a polygonal hole in an interior is obtained. A Voronoi diagram of a set of line segments is obtained and modified to provide a modified Voronoi diagram (VD) having a cycle with one or more trees growing out. For each of the trees, a wave model is defined for a wave that starts at time t=0 on leaves on a boundary of the hole and moves through the tree to hit leaves on a boundary of the polygon at time t=1. A polyline spiral curve toolpath is created by travelling around the wave as it moves towards the boundary of the polygon. A pocket is milled in a solid piece of material by following the polyline spiral curve toolpath.

22 Claims, 14 Drawing Sheets

(56) References Cited

OTHER PUBLICATIONS

Bium, Harry. "A transformation for extracting new descriptions of shape." Symposium on Modeis for the Perception of Speech and Visual Form. 1964.*
Aichholzer, Oswin, et al., "A Novel Type of Skeleton for Polygons", Journal of Universal Computer Science, 1 (12):752-761,1995.
Banerjee, Avisekh, et al., "Process planning for Floor machining of 2½D pockets based on a morphed spiral tool path pattern", Computers & Industrial Engineering, 63(4):971-979, 2012.
Bieterman, Michael B. et al., "A Curvilinear Tool-Path Method for Pocket Machining", Journal of Manufacturing Science and Engineering, Transactions of the ASME, 125(4):709-715, Nov. 2003.
Dijkstra, E. W. "A Note on Two Problems in Connexion with Graphs", Numerische Mathematik, 1(1)269-271, 1959.
Graham, Ronald L., et al., "Finding the Convex Hull of a Simple Polygon", Journal of Algorithms, 4(4):324-331,1983.
Handler, G. Y., "Minimax Location of a Facility in an Undirected Tree Graph", Transportation Science, 7(3)287-293, Aug. 1973.
Held, Martin, "VRONI: An engineering approach to the reliable and efficient computation of Voronoi diagrams of points and line segments", Computational Geometry, 18(2):95-123, 2001.
Held, Martin, et al., "A smooth spiral tool path for high speed machining of 2D pockets", Computer-Aided Design, 41(7):539-550, 2009.
Held, Martin, et al., "Topology-oriented incremental computation of Voronoi diagrams of circular arcs and straight-line segments", Computer Aided Design, 41(4327-338, 2009.
Held, Martin et al., "Improved Spiral High-Speed Machining of Multiply-Connected Pockets", Computer-Aided Design and Applications, 11(3):346-357, 2014, Published online: Dec. 9, 2013.
Huertas-Talón, José L., et al., "Obtaining a spiral path for machining STL surfaces using non-deterministic techniques and spherical tool", Computer-Aided Design, 50:41-50, May 2014.
"Hausdorff distance", Wikipedia, the free encyclopedia, Apr. 10, 2015.
"Voroni diagram", Wikipedia, the free encyclopedia, Sep. 5, 2015. https://en.wikipedia.org/wiki/Voronoi_diagram.

* cited by examiner

SPIRAL TOOLPATHS FOR HIGH-SPEED MACHINING OF POLYGONAL POCKETS

CROSS-REFERENCE TO RELATED APPLICATIONS

This application is related to the following co-pending and commonly-assigned patent application, which application is incorporated by reference herein:

U.S. Patent Application Ser. No. 62/063,283, entitled "SPIRAL TOOLPATHS FOR HIGH-SPEED MACHINING OF POLYGONAL POCKETS WITH OR WITHOUT HOLES", filed on Oct. 13, 2014, by Mikkel Abrahamsen.

BACKGROUND OF THE INVENTION

1. Field of the Invention

The present invention relates generally to computer aided manufacturing (CAM), and in particular, to a method, apparatus, and article of manufacture for spiral machining based on a suitable toolpath.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein.)

A fundamental problem often arising in the CAM industry is to find a suitable toolpath for milling a pocket that is defined by a shape in the plane. A computer numerical control (CNC) milling machine is programmed to follow the toolpath and thus cutting a cavity with the shape of the given pocket in a solid piece of material. The cutter of the machine can be regarded as a circular disc with radius r, and the task is to find a toolpath in the plane such that the swept volume of the disc, when the disc center is moved along the path, covers all of the pocket. One may assume for simplicity that the toolpath is allowed to be anywhere in the pocket.

Some work has been made on spiral toolpaths that morph a point within the pocket to the boundary of the pocket [3, 9, 2, 11, 10]. The method described by Held and Spielberger [9] yields a toolpath that (i) starts at a user-specified point within the pocket, (ii) ends when the boundary is reached, (iii) has no self-intersections, (iv) is $G^1$ continuous (a plane curve is $G^1$ continuous or tangent continuous if there exists a continuous and differentiable parameterization of the curve), (v) makes the width of material cut away at most $\delta$ at any time, where $\delta$ is a user-defined constant called the stepover. One must have $\delta < 2r$, since otherwise some material might not be cut away. Most traditional toolpath patterns have many places where the cutter does not cut away any new material, for instance in retracts where it is lifted and moved in the air to another place for further machining, or self-intersections of the toolpath, where the tool does not cut away anything new when it visits the same place for the second time. That may increase machining time and lead to visible marks on the final product. Spiral toolpaths have the advantage that the cutter is cutting during all of the machining and that, at the same time, the user can control the stepover. Spiral toolpaths are particularly useful when doing high-speed machining, where the rotational speed of the cutter and the speed with which it is moved along the toolpath is higher than in conventional milling. Held and Spielberger [9] provide a more detailed discussion of the benefits of spiral toolpaths compared to various other toolpath patterns and more information on CNC milling in general.

Bieterman and Sandstrom [3] and Huertas-Talón et al. [11] give methods for computing spiral toolpaths by solving elliptic partial differential equation boundary value problems defined on the pocket. However, the methods only work for star-shaped pockets [9] (a polygon is star-shaped if there exists a point p in the polygon such that the segment pq is contained in the polygon for every other point q in the polygon).

It is desirable to provide an alternative construction of spirals that also satisfy the previously mentioned properties of the construction of Held and Spielberger [9]. Held and Spielberger provide a method where the toolpath is generated by interpolating growing disks placed on the Voronoi diagram of the pocket. The union of the discs at a certain time represents the area machined at that time.

SUMMARY OF THE INVENTION

Embodiments of the invention provide the ability to construct spiral toolpaths for high-speed machining. In the simplest case, a polygon and a number s>0 is input, and a spiral is returned that starts at a central point in the polygon, going around towards the boundary while morphing to the shape of the polygon. The spiral consists of linear segments and circular arcs, is tangent continuous, has no self-intersections, and the distance from each point on the spiral to each of the neighboring revolutions is at most s.

Embodiments of the invention are easily adjustable to the case where the there is a hole in the polygon to be avoided by the spiral. In such a case, the spiral starts at the hole and morphs the hole to the outer boundary of the polygon. Further, one may apply such a method to make significantly shorter spirals in polygons with no hole. In addition, embodiments of the invention make a spiral in a polygon with multiple holes by connecting the holes into one hole.

Embodiments of the invention use a Voronoi diagram of the given pocket. A wave is defined that starts at a central point in the Voronoi diagram of the pocket at time 0. When the time increases, the wave moves towards the boundary of the pocket in every direction to that at time 1, it reaches the boundary of the pocket in every direction so that at time 1, it reaches the boundary everywhere. At any time, the wave is a polygon with its corners on the Voronoi diagram of the pocket. A polyline spiral curve is created/constructed by travelling around the wave as it moves towards the boundary. Further, the polyline spiral is rounded by circular arcs to obtain a curve without sharp corners (e.g., to obtain a $G^1$ continuous curve).

In practice, it is very common that there is one or more holes in the pocket that should be avoided by the cutter, for instance if there are islands of material that should not be machined to the same depth. The method of Held and Spielberger [9] only works for simply-connected pockets, i.e., there must be no holes. Embodiments of the present invention provide a natural extension to pockets with one hole. Further, embodiments of the invention utilize Held's VRONI library for the computation of Voronoi diagrams [7].

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Notation and Other General Conventions

Embodiments of the invention use zero-based numbering of arrays. If A is an array, size(A) is the number of elements in A. For a non-empty array A, back(A) is the last element in A, i.e. back(A)=A[size(A)−1]. The operation push(A, x) adds the element x to the back of A, thus increasing size(A) by 1. A semicolon may be used to separate different statements written on the same line. For a point p=(x, y), the point $\hat{p}$=(−y, x) is the counter clockwise rotation of p. Given two distinct points p and q, pq is the segment between p and q, $\overline{pq}$ is the line containing p and q infinite in both directions, and $\overrightarrow{pq}$ is the half-line that starts at p and contains q. Given a set of points S in the plane, ∂S denotes the boundary of S.

Hardware Environment

Figure 1:
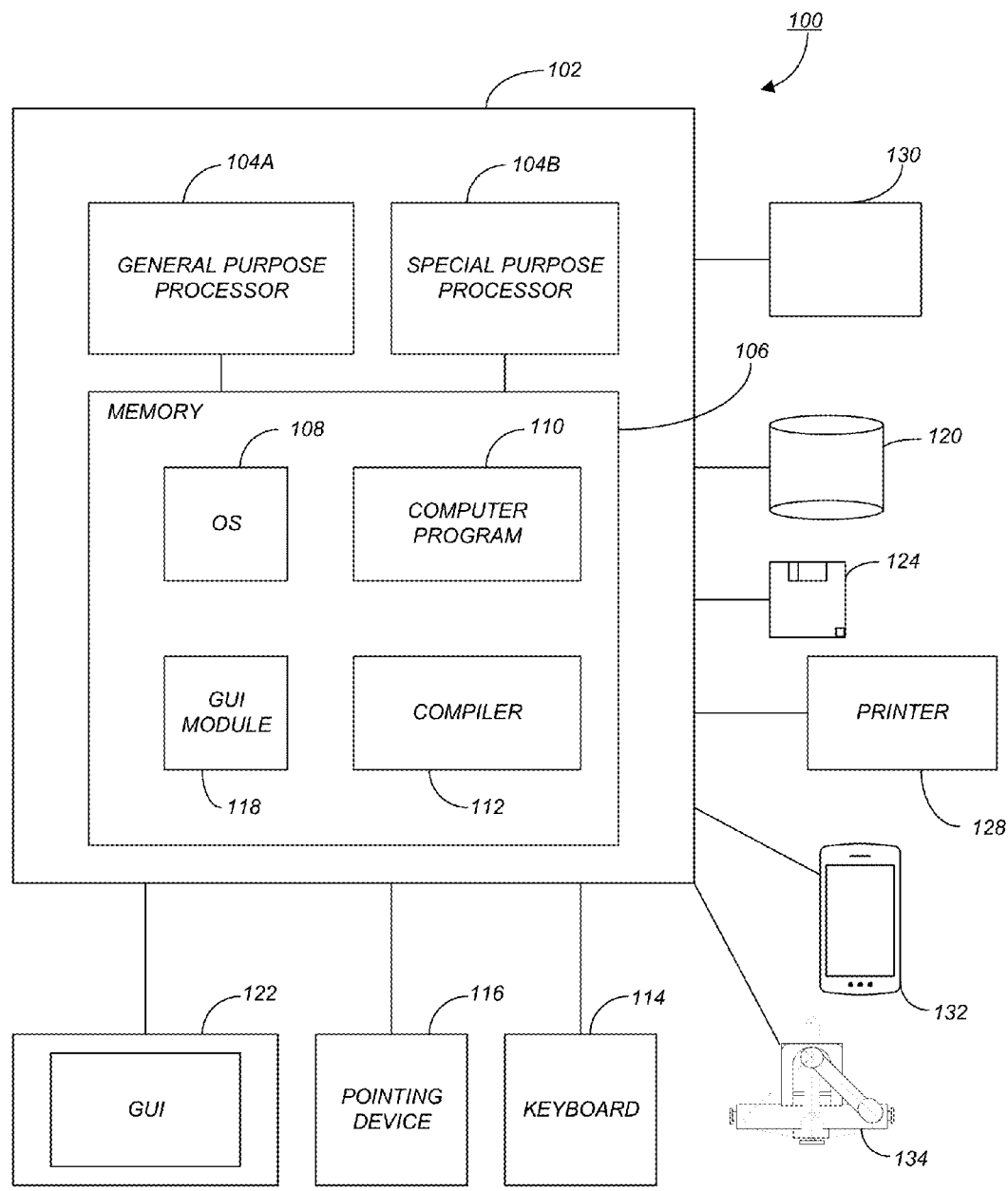
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD, NOOK, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, the computer 102 is communicatively coupled with/to and/or integrated into a CNC milling machine 134. Such a milling machine 134 is configured to accept instructions from or may be programmed (e.g., via computer program 110) to mill a pocket based on a toolpath. In one or more embodiments of the invention, the computer program 110 may consists of a computer-aided machining (CAM) or computer-aided design (CAD) application.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
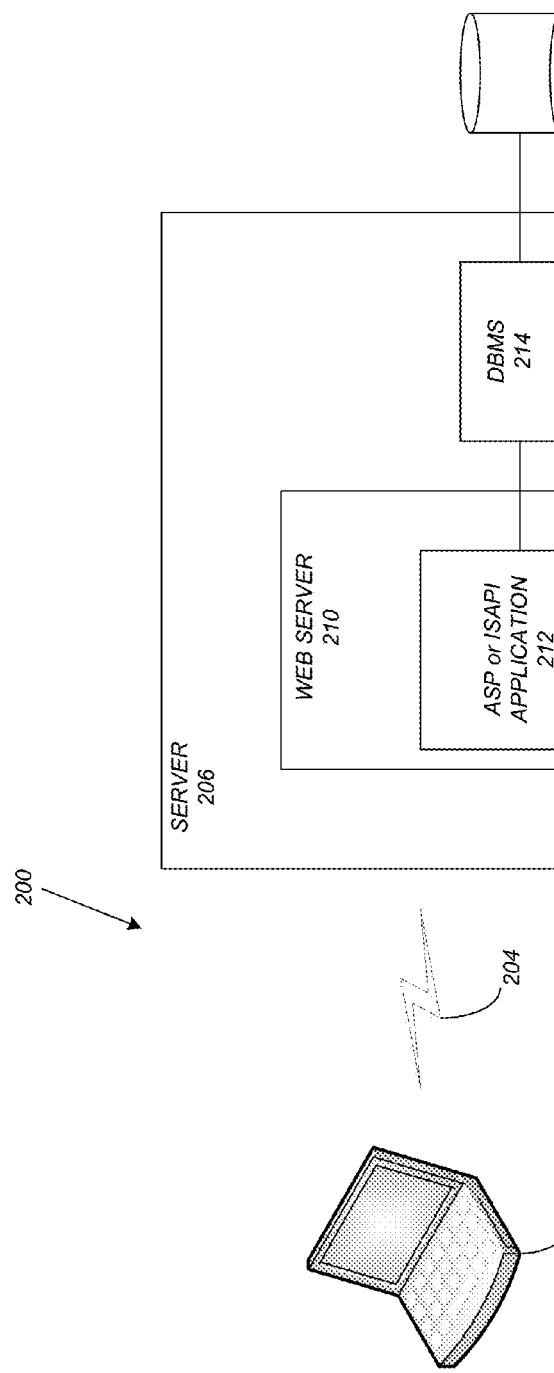
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display. In addition, client 202 or server 206 may be integrated into or may communicate with milling machine 134 to provide the instructions for milling a pocket of a solid body based on a suitable toolpath. The following sections describe: (1) a basic method for making a spiral that morphs a point to the boundary in a simply-connected pocket; (2) how the method is adapted to a pocket with one hole; (3) an alternative spiral in simply-connected pockets; and (4) how to construct a spiral around arbitrarily many holes by first connecting the holes into one hole.

Basic Spiral Construction

This section describes a method to compute a spiral in a given simply-connected two-dimensional (2D) pocket P. In practice, the boundary of a pocket is often described by line segments and more advanced pieces of curves, such as circular arcs, elliptic arcs, and splines. However, it is always possible to use a sufficiently accurate linearization of the input, so one may assume for simplicity that P is a polygon.

Figure 3A:
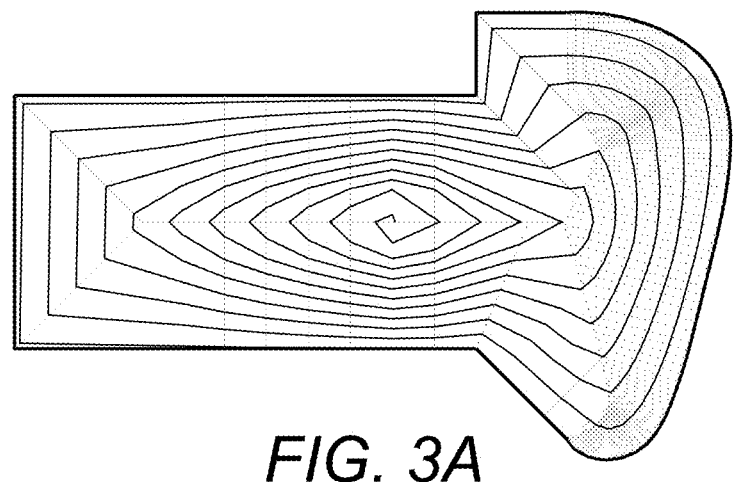
FIG. 3A illustrates a polyline spiral and a Voronoi diagram (VD) in accordance with one or more embodiments of the invention.
Figure 3B:
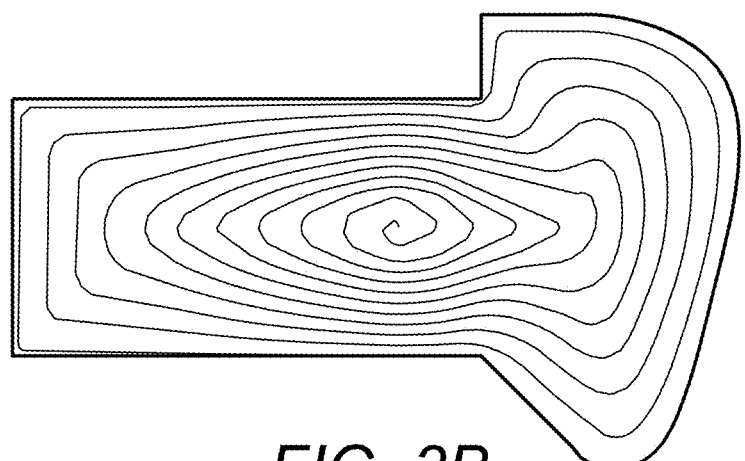
FIG. 3B illustrates a final rounded spiral in accordance with one or more embodiments of the invention.

Embodiments of the invention first construct a polyline spiral as illustrated in FIG. 3A. In this regard, FIG. 3A illustrates a polyline spiral and a Voronoi diagram (VD). Such a polyline spiral may be rounded to get a $G^1$ continuous spiral consisting of line segments and circular arcs (see detailed description further below). Accordingly, FIG. 3B illustrates a final rounded spiral in accordance with one or more embodiments of the invention. The corners of the polyline spiral (i.e., of FIG. 3A) are points on the edges of the Voronoi diagram of P, and there is a corner at each intersection point between the spiral and the Voronoi diagram. One may only consider the part of the Voronoi diagram inside P. Better results (in practice) may be acquired by modifying the Voronoi diagram slightly. Such modifications are described in details further below.

Let VD=VD(P) be the modified Voronoi diagram of the pocket P. Like the Voronoi diagram of P, the modified diagram VD has the following properties which are necessary and sufficient for the computation of the spiral:

VD is a plane tree contained in P;
each leaf of VD is on the boundary ∂P of P;
there is at least one leaf of VD on each corner of P; and
all the faces into which VD divides P are convex.

The Wave Model

One may imagine that a wave starts at time t=0 at the point $p_0$ inside P. The wave moves out in every direction such that at time t=1, it has exactly the same shape as ∂P. The shape of the wave at a specific time is called a wavefront. The wave is growing in the sense that if $0 \le t_1 \le t_2 \le 1$, the wavefront at time $t_1$ is contained in the wavefront at time $t_2$. One may choose $p_0$ as a point in the diagram VD and consider VD as a tree rooted at $p_0$. One can define the time at which the wave hits each node and the speed with which it travels on each edge in VD. The speed of the wave is always constant or decreasing. Thus, one can create a map θ: VD 1→[0, 1] that assigns a time value between 0 and 1 to each point on VD. If p is a point moving along the path on VD from $p_0$ to any leaf, the value θ(p) increases monotonically from 0 to 1. For each time t∈[0, 1], the wavefront is a polygon inside P where the vertices are all the points p on VD such that θ(p)=t. Note that there is exactly one such point on each path from $p_0$ to a leaf of VD.

One may define a time step Δ=1/r for some integer r and compute the wavefront at the times t∈{0, Δ, 2Δ, . . . , rΔ}, where rΔ=1. Note that wavefront refers to the wavefront at time iΔ. r is chosen such that the distance from each point on wavefront i to each of the wavefronts i−1 and i+1 is at most δ when i>0 and i<r, respectively. In other words, the Hausdorff distance between two neighbouring wavefronts is at most δ. Recall that the Hausdorff distance between two sets A and B is max{d(A, B), d(B, A)}, where d(A, B)=$\max_{a \in A} \min_{b \in B}$ ‖a−b‖. For each i=1, . . . , r, one may compute a revolution of the polyline spiral by interpolating between the wavefronts i−1 and i (see description further below for how to make the wavefronts and the interpolation such that the stepover is respected between neighbouring revolutions).

Choosing the Starting Point $p_0$ and the Number of Revolutions of the Spiral

In order to get a spiral with small length, one may attempt to minimize the number of revolutions. Consider the longest path from $p_0$ to a leaf in VD. The length of a path is the sum of edge lengths on the path. If h is the length of the longest path, then ⌈h/δ⌉ wavefronts are necessary and sufficient for the stepover to be respected between all neighbouring wavefronts. Therefore, one may choose $p_0$ as the point in VD that minimizes the longest distance to a leaf in VD. That is a unique point traditionally known as the center of VD. Handler [6] gives a simple O(n) time algorithm to compute $p_0$. The center will most likely not be a node in VD, but an interior point on some edge. In that case, the edge may be split into two edges by introducing a node at $p_0$.

Representation of VD

VD may be considered a directed, rooted tree with the node Root at $p_0$ being the root. Point[n] may be the position of the node n. Let VD[n] be the subtree rooted at node n. One may store a pointer ParentEdge[n] to the edge having end node n ≠Root. One may say that edge ParentEdge[n] is the parent edge of node n and any edge having start node n. One may also store an array ChildEdges[n] of the edges going out of n sorted in counterclockwise order with the edge following ParentEdge[n] being the first. For Root, the choice of the first child edge does not matter. For each edge e, one may store pointers Start[e] and End[e] to the start and end nodes of e. One may also store an index i=IndexInStartNode[e] such that ChildEdges[Start[e]][i]=e. If e is an edge, one may say that Start[e] and End[e] are incident to e and that e is incident to Start[e] and End[e]. For an edge $e_1$ and node n incident to $e_1$, one may let NextEdgeCCW($e_1$, n)=$e_2$, where $e_2$ is the edge after $e_1$ among the edges incident to n in counterclockwise order. The function NextEdgeCCW can be implemented so that it runs in constant time using the values defined here. Using NextEdgeCCW, one can traverse all of VD in a counterclockwise direction in linear time. One starts setting (n, e)←(Root, ChildEdges[Root][0]). In each iteration, one may let n be the other node incident to e and then sets e←NextEdgeCCW(e, n). The process stops when every edge has been traversed, i.e., when (e, n)=(Root, ChildEdges[Root][0]) at the end of an iteration. Note that each edge e is visited twice, once going down the tree D[Start[e]] and once going up.

Defining the Movement of the Wave

Let Height[n] for each node n be the maximal distance from n to a leaf in VD[n]. All the Height values can be computed in linear time by traversing VD once. For each node n, one defines the time TimeN[n] where the wave reaches n. One sets TimeN[Root]←0. One also defines the speed SpeedN[n] that the wave has when it reaches n. One sets SpeedN[Root]←Height[Root].

The wave starts at the root at time t=0 and travels with constant speed SpeedN[Root] on the paths to the farthest leafs in VD. (Due to a choice of the starting point $p_0$, there will always be at least two paths from $p_0$ to a leaf with maximum length.) Hence, it reaches those leafs at time t=1. On all the shorter paths, one makes the wave slow down so that it reaches every leaf at time t=1. It may be found that in practice, a good result may be obtained by using the following model for the speed along shorter paths. Let e be an edge going out of the node n. Let π be the longest path starting with e. By definition, π has length h=l[e]+Height[End[e]], where l[e] is the length of e. Assume that h<Height[n]. In that case, the wave has to slow down on e, since the speed of the wave at node n is determined by Height[n]. One decreases the speed linearly as a function of time such that the wave is decreasing on the first ¼ of π while it has constant speed on the last ¾ of π. The resulting spiral looks wrong if the wave abruptly changes acceleration when it is not needed. Therefore, if the wave is already slowing down when reaching the node n, one might prefer that it keep slowing down on e with the same rate, even though one must use more than ¼ of π. One can do that if Height[n]≤1.1·h, i.e., if π is almost as long as the longest path going out of n. This model is described in greater detail in the following.

Like some other methods described herein, one may come to the model/invention by a long iterative process of experimentation. There might be other models giving equally good or even better results, but embodiments of the present invention have an advantage of being quite simple to implement. It would be interesting to find a model where the acceleration is a continuous function of the time along every path in VD, but it may be difficult to find such a model that could be implemented efficiently.

One defines the values TimeE[e] and SpeedE[e] for each edge e which satisfy TimeE[e]≥TimeN[n] and SpeedE[e]≤SpeedN[n], where n is the node Start[e]. At a time TimeN[n]<t<TimeE[e], the speed of the wave is $$(1-x) \cdot SpeedN[n] + x \cdot SpeedE[e],$$

where $$x = \frac{t - TimeN[n]}{TimeE[e] - TimeN[n]}.$$

When t≥TimeE[e], the speed is SpeedE[e]. Let GetSpeed(e, t) be the speed defined by the values of edge e and n=Start[e] at time t. Let GetDist(e, t) be the distance traveled by the wave from time TimeN[n] to t≥TimeN[n]. One has:

$$GetDist(e,t) = \int_{TimeN[n]}^{t} GetSpeed(e,u) du,$$

which can be computed easily since GetSpeed(e, u) is piecewise linear. One also needs the function GetTime(e, d) which is the time t such that GetDist(e, t)=GetTime is the inverse of GetDist, i.e., GetTime(e, GetDist(e, t))=t and GetDist(e, GetTime(e, d))=d. For any edge e, let l[e] be the length of e. When 0<d<GetDist(TimeE[e]), GetTime(e, d) is computed by solving a quadratic equation. When d≥GetDist(TimeE[e]), one gets a linear equation. Finally, GetPoint(e, t) returns the point (1−x)·Point[n]+x·Point[m], where x←GetDist(e, t)/l[e] and m=End[e]. For TimeN[n]≤t≤TimeN[m], GetPoint(e, t) is the position of the wave on edge e at time t.

Assume that one has defined TimeN, SpeedN, TimeE, and SpeedE on all nodes and edges on the path from Root to some non-leaf node n. "Method 1" computes the values for an edge e going out of n and for the node End[e].

---

Method 1: SetTimesAndSpeeds(e)

1   n ← Start[e]; m ← End[e]; $t_n$ ← TimeN[n]; vn ← SpeedN[n]
2   if n = Root
3     $t_e$ ← TimeN[n]; $v_e$ ← SpeedN[n]
4   else
5     $e_p$ ← ParentEdge[n]; $t_e$ ← TimeE[$e_p$]; $v_e$ ← SpeedE[$e_p$]
6   TimeE[e] ← $t_e$
7   SpeedE[e] ← $v_e$
8   h ← Height[m] + l[e]
9   if GetDist(e, 1) > h
10     ReuseAcc ← False
11     if $t_n$ < $t_e$ and Height[n] ≤ h · 1.1

12         $a \leftarrow \dfrac{v_e - v_n}{t_e - t_n}$ 13         v1 ← vn + a · (1 − tn)

14         $s \leftarrow \dfrac{v_n + v_1}{2} \cdot (1 - t_n)$ 15         if s ≤ h
16           Define TimeE[e] and SpeedE[e] such that GetDist(e, 1) = h and $$\frac{SpeedE[e] - v_n}{TimeE[e] - t_n} = a.$$

17           ReuseAcc ← True
18     if ReuseAcc = False
19         Define TimeE[e] and SpeedE[e] such that GetDist(e, 1) = h and
          GetDist(e, TimeE[e]) = 0.25 · h.
20   TimeN[m] ← GetTime(e, l[e])
21   SpeedN[m] ← GetSpeed(e, TimeN[m])

---

In lines 6-7, the same values are used for e as for the previous edge $e_p$. If, however, the length h of the longest path starting with edge e is smaller than the longest of all paths going out of n, the case of line 9 applies where one needs the wave to slow down. Lines 12-14 compute the distance s that the wave will travel if it continues to decrease speed with the same rate until time 1. One can only keep using the same acceleration if s is smaller than h. If one cannot keep using the same acceleration or the speed of the wave is not decreasing at the node n, one defines the values in line 16 as previously described. Both of the lines 16 and 19 give two equations in the two unknowns TimeE[e] and SpeedE[e]. Each pair of equations lead to a quadratic equation in one of the unknowns, and one needs to choose the unique meaningful solution. The time and speed values are assigned to every node and edge in linear time by traversing VD once.

Method 2 sets times and speeds for all nodes and edges by traversing VD once:

| | Method 2: SetAllTimesAndSpeeds( ) |
|---|---|
| 1 | $(n_0, e_0) \leftarrow$ (Root, ChildEdges[Root][0]) |
| 2 | $(n, e) \leftarrow (n_0, e_0)$ |
| 3 | repeat |
| 4 | if n = Start[e] |
| 5 | SetTimesAndSpeeds(e) |
| 6 | n ← End[e] |
| 7 | else |
| 8 | n ← Start[e] |
| 9 | e ← NextEdgeCCW(e, n) |
| 10 | until $(n, e) = (n_0, e_0)$ |

Constructing the Wavefronts
One makes a spiral with $$r \leftarrow \left\lceil \frac{\text{Height[Root]}}{\delta'} \right\rceil$$

revolutions, where $\delta'=0.95\cdot\delta$. One uses the slightly smaller stepover $\delta'$ so that the maximum distance between two neighbouring revolutions is smaller. That gives more flexibility to round the spiral later on as described below. One sets $\Delta \leftarrow 1/r$ and computes a wavefront for each of the times $\{0, \Delta, 2\Delta, \ldots, r\Delta\}$. The two-dimensional array Wavefront stores the wavefronts, so that the wavefront at time i$\Delta$ is the array Wavefront[i]. Wavefront i is constructed by traversing VD once and finding every point on VD with time i$\Delta$ in counterclockwise order. Let e be an edge that has not visited before, and let n=Start[e] and m=End[e]. There is a corner of wavefront i on e if TimeN[n]<i$\Delta\le$TimeN[m]. If that is the case, one pushes GetPoint(e, i$\Delta$) to Wavefront[i]. One makes one corner in Wavefront[0] for each of the child edges of the root ChildEdges[Root], all on the point Point[Root]. Using this construction, there is exactly one corner of each wavefront on each path from Root to a leaf of VD.

For each corner Wavefront[i][w], one stores the length of the part of the wavefront up to the corner, i.e.

WavefrontLength[i][w]=$\Sigma_{j=1}^{w}$||Wavefront[i][j]−Wavefront[i][j−1]||, where ||•|| is the Euclidean norm. One also stores the total length of Wavefront[i] as Total WavefrontLength[i]. The value WavefrontOnEdge[i][w] stores the edge e on which Wavefront[i][w] is.

Figure 4A:
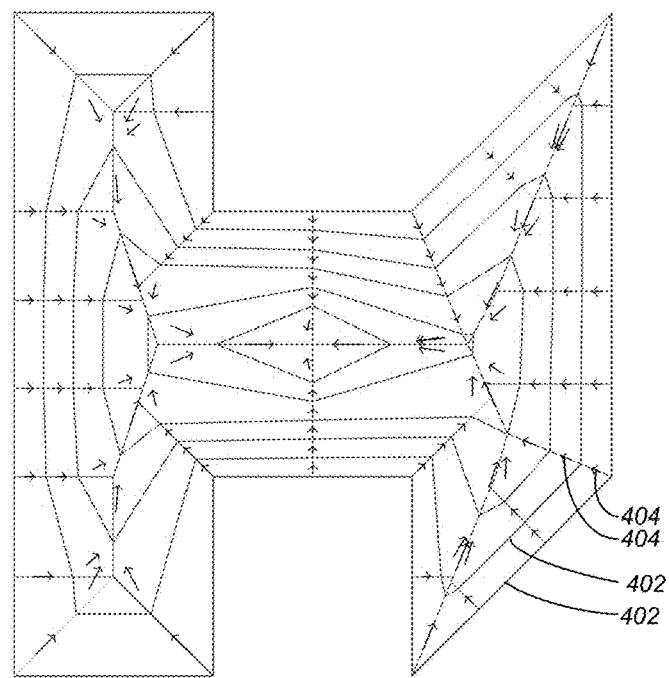
FIGS. 4A-4B illustrate the construction of a polyline spiral in a polygon P in accordance with one or more embodiments of the invention.
Figure 4B:
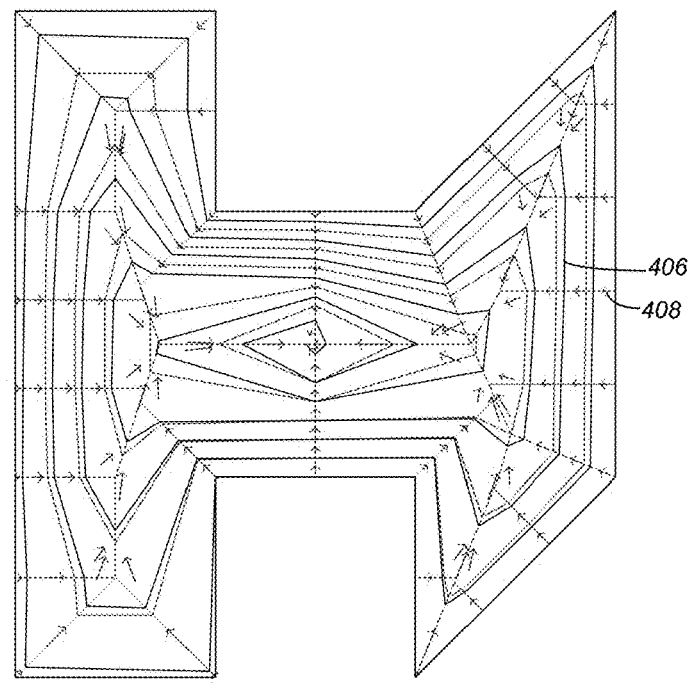

One introduces a rooted tree with the wavefront corners as the nodes. FIGS. 4A-4B illustrate the construction of a polyline spiral in a polygon P in accordance with one or more embodiments of the invention. In particular, FIG. 4A illustrates the wavefronts 402 and arrows 404 from each wavefront corner to its parent. FIG. 4B illustrates the polyline spiral 406 obtained by interpolating between the wavefronts. The arrows 408 are from each corner of the spiral to its parent. The parent of a corner Wavefront[i][w], i>0, is the unique corner Wavefront[i−1][w'] on wavefront i−1 on the path from Wavefront[i][w] to Root. w' is stored as ParentWavefrontCorner[i][w], i.e., the parent of Wavefront[i][w] is Wavefront[i−1][ParentWavefrontCorner[i][w]].

The Hausdorff distance is bound between two neighbouring wavefronts i−1 and i using the following lemma:

Lemma 1. Let X and Y be two polygonal chains given by the points $x_0, \ldots, x_{n-1}$ and $y_0, \ldots, y_{m-1}$, respectively. If there exists a set $S=\{(i_0, j_0), \ldots, (i_{s-1}, j_{s-1})\}$ of pairs of indices in $\{0, \ldots, n-1\} \times \{0, \ldots, m-1\}$ such that $(i_0, j_0)=(0, 0)$ and $(i_{s-1}, j_{s-1})=(n-1, m-1)$,
$i_{p+1}\in\{i_p, i_{p+1}\}$ and $j_{p+1}\in\{j_p, j_{p+1}\}$ for each p=0 ..., s−2,
$\|x_{i_p}-y_{j_p}\|\le\delta$ for any p=0, ..., s−1, then the Hausdorff distance between X and Y is at most $\delta$.

Proof. Let X, Y, and S be given as in the lemma. Let q be a given point on X Assume that q is on the segment $x_r x_{r+1}$. It follows from the assumptions that there exists t$\in\{0, \ldots, s-1\}$ such that either $\{(r, t), (r+1, t)\}\subseteq S$ or $\{(r, t), (r+1, t+1)\}\subseteq S$. In the first case, both $x_r$ and $x_{r+1}$ are at most $\delta$ from $y_t$, so that it must also be true for the intermediate point q. In the second case, $\|x_r-y_t\|\le\delta$ and $\|x_{r+1}-y_{t+1}\|\le\delta$, and it follows that p is at most $\delta$ away from some point on $y_t y_{t+1}$. Since the lemma is symmetric in X and Y, one also has that the distance from any point on Y to X is at most $\delta$. Therefore, the Hausdorff distance between the two chains is at most $\delta$.

Proposition 1. The Hausdorff distance between wavefronts i−1 and i is at most $\delta$ for any i=1, ..., r Proof. Apply Lemma 1 where X is wavefront i−1, Y is wavefront i, and $S=\{(p_0, 0), (p_1, 1), \ldots, (p_{s-1}, s-1)\}$, where $p_j$=ParentWavefrontCorner[i][j] and s=size(Wavefront[i]).

Lemma 2. Different wavefronts do not intersect each other.

Proof. Consider one of the faces f into which VD subdivides P. The boundary of f consists of a segment $s_1 s_2$ of $\partial P$ and a path $\pi$ in VD from $s_1$ to $s_2$, ignoring the orientations on the edges. Consider the point p$\in\pi$ with the lowest time $\theta(p)$. The wave reaches p before any other point on $\pi$, and thereafter moves along the two sub-paths $\pi_1$ from p to $s_1$ and $\pi_2$ from p to $s_2$. It follows from the convexity of f that two segments with one endpoint on $\pi_1$ and the other on $\pi_2$, where the endpoints of each segment have the same time, do not cross each other.

Interpolating Between the Wavefronts

One constructs a polyline spiral stored as an array "Spiral". For each i=1, ..., r, one constructs one revolution of the spiral by interpolating between wavefront i−1 and wavefront i. Every corner of the spiral is a point on VD. There is exactly one spiral corner on the path in VD from each wavefront corner Wavefront[i][w] to its parent Wavefront[i−1][pw], where pw=ParentWavefrontCorner[i][w]. The first corner Spiral[0] is on the root node of VD, and for every other corner Spiral[s], s>0, one stores an index Parent[s] such that Spiral[Parent[s]] is the first corner one meets on the path in VD from Spiral[s] to the root. FIG. 4B shows the resulting polyline spiral and the parents of each corner.

When a spiral corner Spiral[s] which is on the path from Wavefront[i][w] to its parent wavefront corner Wavefront[i−1][pw] is constructed, the pointer ParentSpiralCorner[i][w]=s is stored. Therefore, when a new spiral corner Spiral[r] on the path from Wavefront[i+1][w1] to its parent Wavefront[i][pw'] is made, the parent of Spiral[r] is defined to be Parent[r]=ParentSpiralCorner[i][pw']. The spiral is defined such that the distance between a spiral corner and its parent is at most $\delta'$. It follows that the Hausdorff distance between two neighbouring revolutions is at most $\delta'$.

For each wavefront corner Wavefront[i][w], the point Q[w] on the path to Wavefront[i−1][pw] is found, where pw=ParentWavefrontCorner[i][w], with time $$t_w = (i-1)\Delta + \frac{WavefrontLength[i][w]}{TotalWavefrontLength[i]}\Delta.$$

Figure 5A:
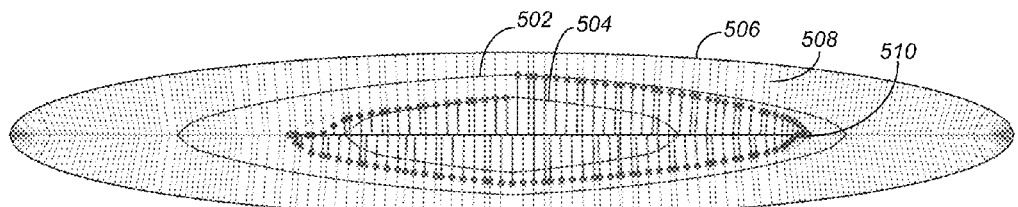
FIGS. 5A and 5B illustrate interpolations between wavefronts in accordance with one or more embodiments of the invention.
Figure 5B:
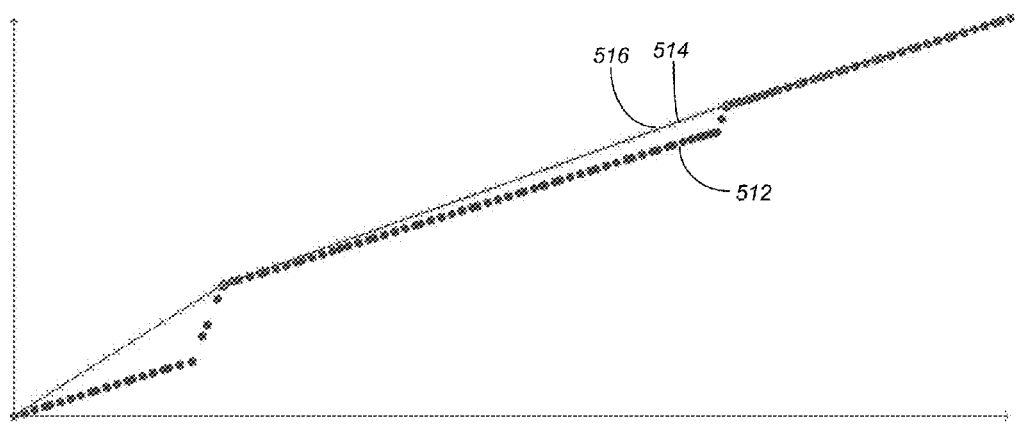

If Q[w] is more than δ' away from Spiral[ParentSpiral-Corner[i−1][pw]], Q[w] is chosen to be the point on the same path which is exactly δ' away. The path from Q[w] to the root of VD is marked. FIGS. 5A and 5B illustrate interpolations between wavefronts in accordance with one or more embodiments of the invention. In particular, FIG. 4A illustrates the interpolation between two wavefronts 502 and 504, with a boundary 506 and VD 508. Crosses 510 are the resulting points of the polyline spiral stored in Spiral after the convexification process. FIG. 5B illustrates related values for the same interpolation as that of FIG. 5A: the points (D[w],T[w]) are illustrated at 512, the upper convex hull T of the points is 514, and the crosses 516 are the points (D[w],T(D[w])) on that hull.

When the marking is done for each w, wavefront i is traversed once more. For each wavefront corner Wavefront [i][w], the first marked point on the path to the root is found. Let P[w] be that point and T[w]=θ(P[w]) be its time. Thus, T[w]≥$t_w$, because a later wavefront corner Wavefront[i][w'], w'>w, can mark more of the path between corner w and the root. Therefore, P[w]=P[w+1] for some w. There is exactly one distinct P-point one each path from a wavefront corner to the root.

The polyline defined by the points $$P[0], \atop v=0$$

P[1], . . . is basically an interpolated spiral, but the points have a tendency to have unnecessarily sharp corners if VD is relatively dense, which is often the case for real-world polygons. To smooth the spiral out a bit, embodiments of the invention apply a method denoted as the convexification (see FIGS. 5A-5B).

Let $D[w] = \Sigma_{v=0}^{w-1} \|P[v]-P[v+1]\|$ be the length of the polyline until P[w] and consider the points (D[w], T[w]). One computes the upper convex hull of these points, e.g. using the method of Graham and Yao [5]. Let T be the function whose graph is the upper hull. By definition, T[w]≤T(D[w]) for each w=0. The corners of Spiral can be chosen in the following way: For each wavefront corner Wavefront[i][w], one finds the point on the path to the root with time T (DM). If it is more than δ' away from its parent spiral corner, the point on the path which is exactly δ' away is chosen instead. Since the spiral corners are obtained by moving the P-points closer to wavefront i, one gets exactly one distinct spiral corner on each path from a wavefront corner to the root. When VD is sparse like FIGS. 4A and 4B, the convexification makes no visible difference between the P-points and the final points in Spiral, but when VD is dense as in FIG. 5A, the effect is significant. One also adds one revolution around P to the end of the polyline spiral, which is used to test that the last interpolated revolution respects the stepover when rounded later on. The edge containing Spiral[s] is stored as SpiralOnEdge[s].

Lemma 3. The polyline spiral constructed as described satisfies that the distance from a point on one revolution to the neighbouring revolutions is at most δ' and the spiral has no self-intersections.

Proof. By Lemma 1, it follows from the construction of the spiral that the stepover δ' is respected. Each revolution is between two neighbouring wavefronts, since all the corners of the interpolation between wavefronts i and i+1 have times in the interval [iΔ, (i+1)Δ]. Because the wavefronts do not intersect by Lemma 3, the different revolutions of the polyline spiral cannot either. One revolution does not intersect itself because each face f into which VD subdivides P contains at most one segment of the revolution, since there is exactly one point of each revolution on each path from the root of VD to a leaf.

Enriching of the Diagram

Figure 6A:
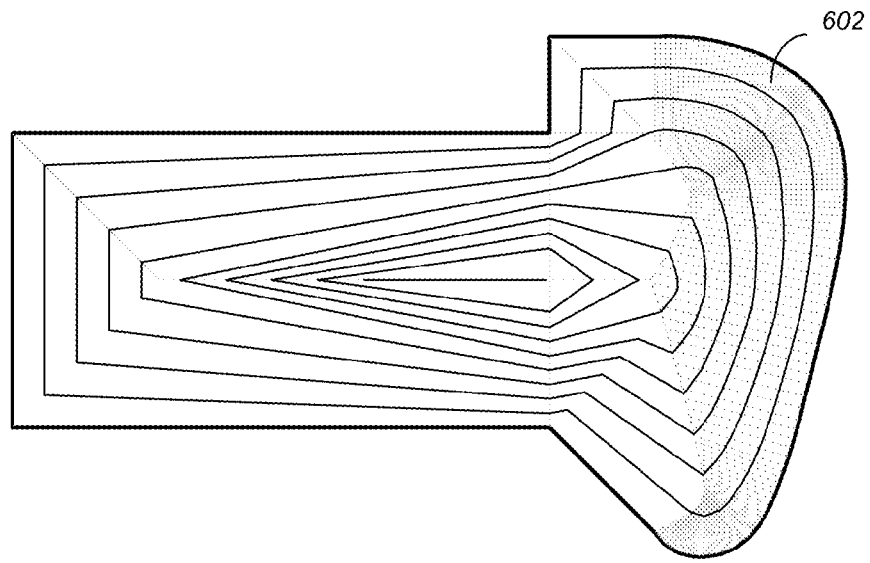
FIGS. 6A and 6B illustrate the wavefronts in a polygon P for a stepover δ but using two different diagrams to define the wavefronts in accordance with one or more embodiments of the invention.
Figure 6B:
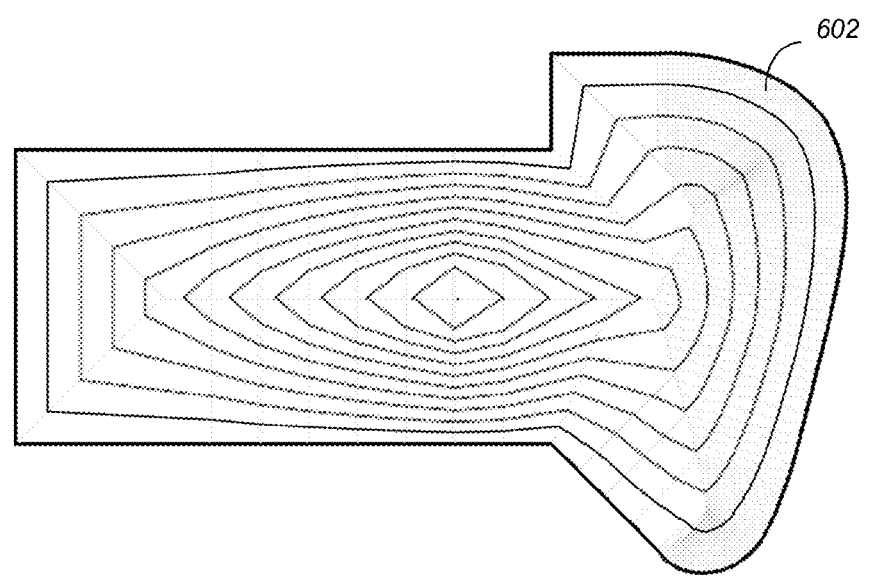
Figure 7A:
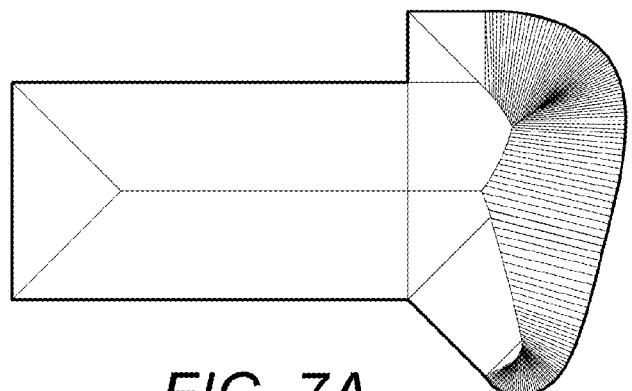
FIGS. 7A-7C illustrate an example of modifications made on Voronoi diagrams in accordance with one or more embodiments of the invention.
Figure 7B:
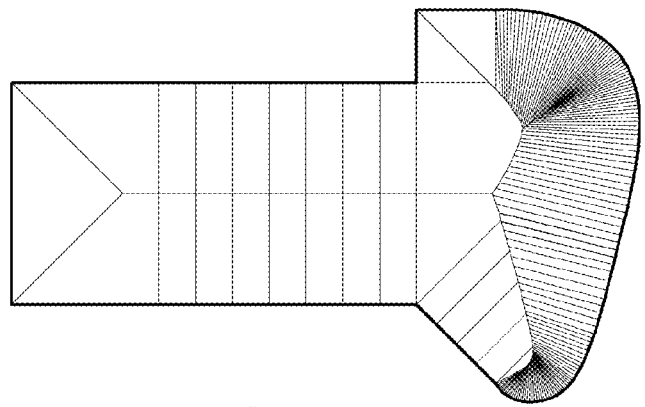
Figure 7C:
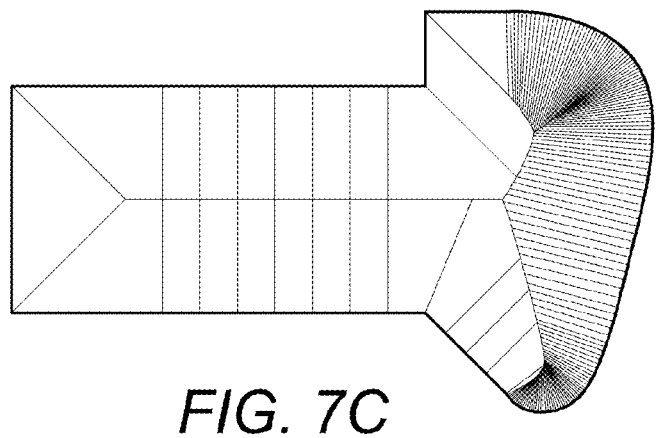

In this and the following section, some modifications made on the Voronoi diagram of P before doing anything else are described. The result is the diagram VD=VD(P). Long edges on P lead to long faces in the Voronoi diagram, so that the wave is not moving towards the boundary ∂P in a natural way. FIGS. 6A and 6B illustrate the wavefronts in the same polygon P for the same stepover δ but using two different diagrams to define the wavefronts in accordance with one or more embodiments of the invention. In particular, FIG. 6A illustrates the wavefronts obtained using the Voronoi diagram 602. FIG. 6B illustrates the wave fronts obtained using VD 604 (i.e., the modified Voronoi diagram). In FIG. 6A, the wave starts on a long edge, and the first three wavefronts are all degenerated polygons with only two corners, both on the edge. Therefore, one needs edges going directly to the boundary with a distance to each other of about δ, so that each wavefront has corners on more edges than the previous one. This may be obtained by traversing the Voronoi diagram and inspecting each pair of consecutive leafs $l_1$ and $l_2$. Such a pair of nodes are on the same or on two neighbouring corners of P. Assume the latter, so that there is a segment S on ∂P from $l_1$ to $l_2$ and a face f of the Voronoi diagram to the left of S. Let s←Point[$l_2$]−Point[$l_1$] be the vector from $l_1$ to $l_2$, d←∥s∥ be the length of S and m←⌈d/δ⌉. One wants to subdivide f into m faces. Let $$p_i \leftarrow \text{Point}[l_1] + s \cdot \frac{i}{m}, i = -1, \ldots m-1,$$

be interpolated points on S. Let $h_i = \overrightarrow{p_i, p_i + \hat{s}}$ be the half-line starting at $p_i$ with direction ŝ, where ŝ is the counterclockwise rotation of s. For each i=1, . . . , m−1, the first intersection point between $h_i$ and the Voronoi diagram is found. Assume the intersection for some i is a point q on an edge e. If the smallest angle between $h_i$ and e is larger than 50 degrees, e is split into two edges by introducing a node at q and adding a segment from that node to a new node at $p_i$. If the smallest angle is less than 50 degrees, the Voronoi diagram is moving fast enough towards the boundary so that the wavefronts will be fine in that area without adding any additional edges. FIGS. 7A-7C illustrate an example of modifications made on Voronoi diagrams in accordance with one or more embodiments of the invention. FIG. 7A illustrates the Voronoi diagram, and FIG. 7B illustrates the Voronoi diagram enriched with equidistantly placed segments perpendicular to long edges. In other words, FIG. 7B shows the result of enriching the Voronoi diagram shown in FIG. 7A. FIG. 7C illustrates the final diagram VD where double edges going to concave corners of P are replaced by their angle bisector.

Removing Double Edges to Concave Corners

A concave corner of P is a corner where the inner angle is more than 180 degrees. Each concave corner c on P leads to a face in the Voronoi diagram of all the points in P being closer to c than to anything else on the boundary of P. Therefore, there are two edges $e_1$ and $e_2$ of the Voronoi diagram with an endpoint on c. It has been found that a better spiral is obtained if these edges are removed, and instead, an edge is added following the angle bisector of the edges, i.e., the bisector from c is followed, and the first intersection point q with the Voronoi diagram is found, and an edge is added from q to c (see FIG. 7C). The reason that this process improves the resulting spiral is that the wavefronts will resemble P more because they will have one corner on the bisector edge corresponding to the corner c on P. One can only do this manipulation if the resulting faces are also convex. That is checked easily by computing the new angles of the manipulated faces and seems to be the case almost always.

Rounding the Polyline Spiral

For each corner on the polyline spiral, a part of the spiral containing the corner may be substituted with a circular arc which is tangential to the polyline spiral in the endpoints. That gives a spiral which is a differentiable curve, i.e., with no sharp corners. Each arc is either clockwise (CW) or counterclockwise (CCW). For each index i, let $s_i$=Spiral[i] Spiral[i+1] be the segment from Spiral[i] to Spiral[i+1] and $v_i$=Spiral[i+1]−Spiral[i] be the vector from Spiral[i] to Spiral[i+1]. Each arc has the startpoint p on some segment $s_a$ and the endpoint q on another segment $s_b$, a<b, so that the arc substitutes the part of the polyline spiral from p to q. One can say that the arc rounds the corners a+1 to b. The arc is called tangential if it is CCW and its center is on the half-lines $\overrightarrow{p, p+\vec{v}_s}$ and $\overrightarrow{q, q+\vec{v}_r}$ or it is CW and its center is on the half-lines $\overrightarrow{p, p-\vec{v}_s}$ and $\overrightarrow{q, q-\vec{v}_r}$.

A pointer Arc[i] to the arc is stored that substitutes the corner Spiral[i]. The same arc can substitute multiple consecutive corners, so that Arc[i]=Arc[i+1]= . . . =Arc[i+k−1]. In that case, when Arc[i−1]≠Arc[i]≠Arc[i+k], the neighbours of Arc[i] are Arc[i−1] and Arc[i+k]. Two different arcs must substitute disjoint parts of the polyline spiral for the rounded spiral to be well-defined. Each segment $s_a$ is subdivided at a point $p_a \in s_a$ such that an arc ending at $s_a$ must have its endpoint at the segment Spiral[a]$p_a$ and an arc beginning at $s_a$ must startpoint on the segment $p_a$Spiral[a+1]. The point $p_a$ is chosen as a weighted average of Spiral[a]1 and Spiral[a+1] so that the arc rounding the sharpest of the corners Spiral[a] and Spiral[a+1] gets most space. Let $\phi_a$ be the angle at corner Spiral[a] of the polyline spiral where $\phi_a$ is chosen to be at most π. One sets $$w_a = \frac{\pi - \phi_a}{2\pi - \phi_a - \phi_{a+1}}$$

and choose $p_a$ as $p_a=(1-w_a) \cdot $Spiral$[a]+w_a \cdot $Spiral$[a+1]$.

A priority queue Q of the arcs is kept that can possibly be enlarged. After each enlargement of an arc, the resulting spiral respects the stepover δ. Initially, one lets each corner be rounded by a degenerated zero-radius arc, and Q contains all these arcs. One considers the front arc A in Q and tries to find another arc A' that substitutes a longer chain of the polyline spiral. The new arc A' has a larger radius than A. If possible, A' is chosen so that it also substitutes one or, preferably, two of the neighbours of A. If successful, the arc A' rounds the union of the corners previously rounded by those two or three arcs. The Arc-pointers are updated and the arcs that A' substitutes from Q are removed. A' is added to Q as well as the arcs rounding the children and parents in the polyline spiral of all the corners that A' round, since it is possible that those arcs can now be enlarged. If no larger arc A' is found, A is just removed from Q. The rounding process terminates when Q is empty.

The order of the arcs in Q is established in the following way: It may be found that giving the arc A the priority $P(A)=r(A)/r(C_{max})+1/s(A)$ gives good results, where r(A) is the radius of A, s(A) is the size of the subtended angle from the center of A in radians, and $r(C_{max})$ is the radius of the maximum circle contained in P. The front arc in Q is the one with smallest P-value. One divides by $r(C_{max})$ to make the rounding invariant when P and δ are scaled by the same number. $r(C_{max})$ can be obtained from the Voronoi diagram of P, since the largest inscribed circle has its center on a node in the diagram. If s(A)=0, one sets P(A)=∞, since there is no corner to round.

One may see that arcs with small radii or large subtended angles are chosen first for enlargement. In the beginning when all the arcs in Q have zero radius, the arcs in the sharpest corners are chosen first because their degenerated arcs have bigger subtended angles—even though the radius is zero, one can still define the start and end angle of the arc according to the slope of the segments meeting in the corner and thus define the subtended angle of the arc.

One tests that an arc A gives a spiral respecting the stepover in following way: Given a part of the spiral from a point p∈$s_a$ to a point q∈$s_b$, consider the smallest number $c_a$ such that Parent[$c_a$]=a and the largest number $c_b$ such that Parent[$c_b$]=b+1. Let $C_a$ be the startpoint of Arc[$c_a$] and $C_b$ the endpoint of Arc[$c_b$]. When the arcs have never been enlarged, $C_a$=Spiral[$c_a$] and $C_b$=Spiral[$c_b$]. The part of the spiral from $C_a$ to $C_b$ is called the child part of the part from p to q. Similarly, let $P_a$ be the startpoint of Arc[Parent[a]] and $P_b$ the endpoint of Arc[Parent[b+1]]. The part of the spiral from $P_a$ to $P_b$ is called the parent part of the part from p to q. To test if the spiral satisfies the stepover with a new enlarged arc A from a point p to q, one can test if the maximum distance:

from a point on A to the child part of A,
from a point on the child part to the parent part of the child part,
from a point on A to the parent part of A, and
from a point on the parent part to the child part of the parent part is at most δ.

Figure 3C:
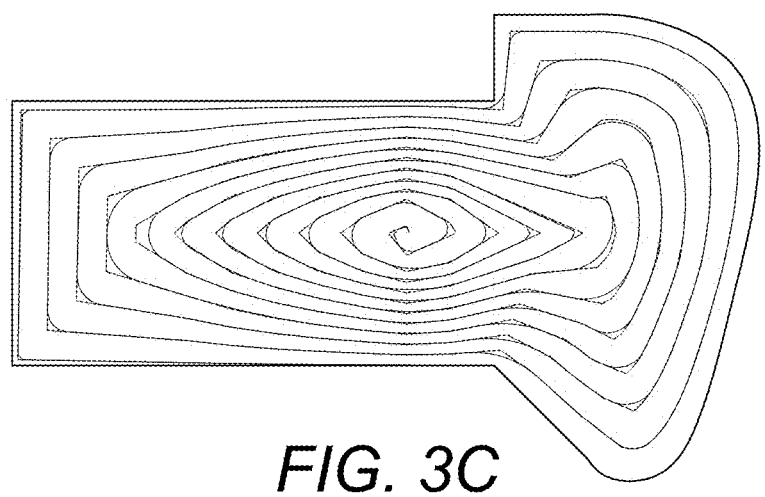
FIG. 3C illustrates a comparison between the rounded and unrounded spiral of FIGS. 3A and 3B in accordance with one or more embodiments of the invention.

Since the parent part of the child part of A contains A and the child part of the parent part of A contains A, the Hausdorff distance between the revolution containing A and the neighbouring revolutions is at most δ when the test succeeds. To compute the distance between two parts, one notes that the maximal distance from a point on a part S of the spiral to another part R is at most δ if and only if S is contained in the offset of R by δ. In the present case, it is sufficient to run through the pieces of the two parts in parallel, where a piece is either an arc or a line segment. Let $P_S$ and $P_R$ be the two considered pieces, respectively. If each point in $P_S$ is at most δ away from some point in $P_R$, one considers the next piece of S. Otherwise, one considers the next piece of R. If one does not get to the end of the part S by doing this search, the distance from S to R is too big. FIG. 3C illustrates a comparison between the rounded and unrounded spiral of FIGS. 3A and 3B. In other words, FIG.

3C illustrates the spirals from FIGS. 3A and 3B together. Note that some of the arcs of the rounded spiral rounds multiple corners of the polyline spiral. One also needs to ensure that an arc does not intersect neighbouring revolutions. This may be done by requiring that the minimum distance from a point on the arc to the child and parent part is in the interval $[d_{min}/1.2, 1.2 \cdot d_{min}]$, where $d_{min}$ is the minimum distance from the part of the polyline spiral substituted by the arc to the child and parent part in the polyline spiral, respectively. Similarly, one may require that the maximum distance is in the interval $[d_{max}/1.2, 1.2 \cdot d_{max}]$. The distances are computed in a similar way to the check of the stepover by running through the parts in parallel.

If two or three arcs are substituted by one larger arc each time a larger arc is successfully made, one can be sure that the rounding process does terminate, since the complexity of the spiral decreases. However, it is often not possible to merge two or three arcs, but only to make a larger arc rounding the same corners as an old one. The rounded spiral gets better, but it cannot be proven that the process finishes. In practice, a fast termination may be seen in any tested example. A possible remedy could be only to allow each arc to increase in size without rounding more corners a fixed number of times.

Spiral Construction Adapted to a Pocket with One Hole

In many practical applications, the area to be machined is not simply connected, but has one or more "holes" that should not be machined. It might be because there are physical holes in the part or islands of a thicker layer of material not to be machined in the same depth. Therefore, assume that a polygon P and a polygonal hole H in the interior of P are given/provided.

Figure 8A:
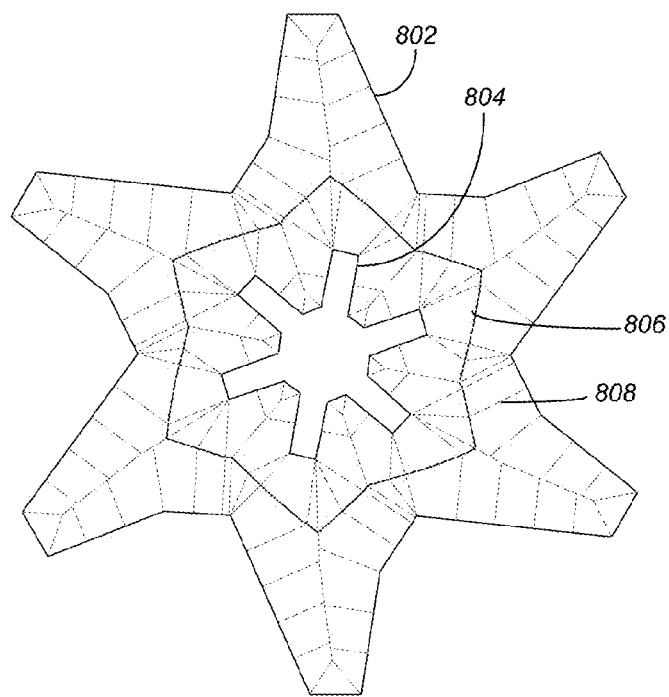
FIGS. 8A-8B illustrate an exemplary polygon/pocket, hole, and resulting spiral in accordance with one or more embodiments of the invention.
Figure 8B:
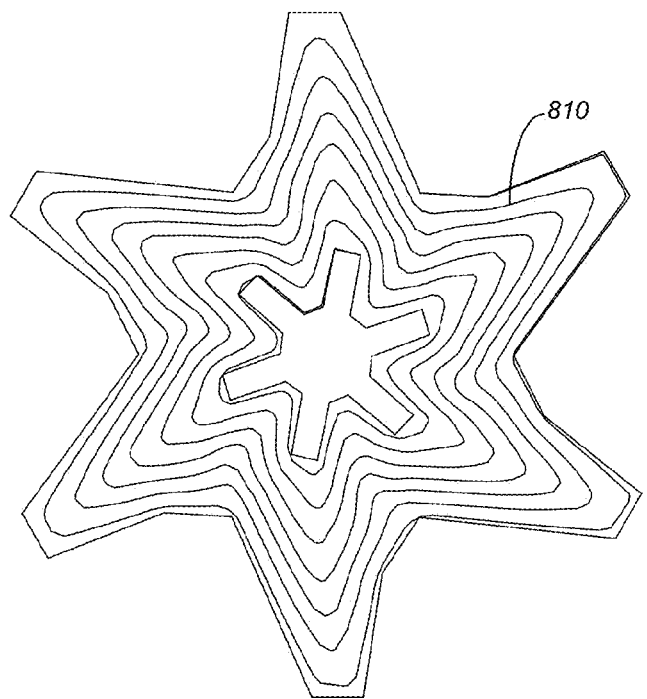

Further below is a description of a method to deal with multiple holes. P\H denotes the closed set of points that are in the interior or on the boundary of P but not in the interior of H. One wants to compute a spiral that is contained in P\H such that the Hausdorff distance is at most δ between (i) two consecutive revolutions, (ii) ∂H and the first revolution, and (iii) ∂P and the last revolution. As before, δ is the user-defined stepover. It may also be required that the spiral has no self-intersections. FIGS. 8A-8B illustrate an exemplary polygon/pocket, hole, and resulting spiral in accordance with one or more embodiments of the invention. In particular, FIG. 8A illustrates a polygon P 802 with a hole H 804. The diagram VD of P\H is drawn with the cycle C 806 and other edges 808. FIG. 8B illustrates the resulting spiral 810. As in the case with a simply-connected pocket, one may use a wave model to construct the spiral. A wave that has exactly the shape of ∂H at time 0 and moves towards ∂P is imagined, so that at the time 1, it reaches ∂P everywhere.

The Voronoi Diagram of a Polygon with a Hole

The Voronoi diagram of the set of line segments of P and H can be used. As in the case with no holes, the diagram may be modified slightly. Let VD=VD(P\H) be the modified polygon. Like the true Voronoi diagram, the modified diagram VD has the following properties:

VD is a connected, plane graph contained in P\H,
each leaf of VD is on the boundary of P or H,
there is at least one leaf of VD on each corner of P and H,
all the faces into which VD divides P\H are convex, and
VD contains exactly one cycle, the cycle is the locus of all points being equally close to ∂H and ∂P, and H is contained in its interior.

As in the case of a polygon without a hole, the Voronoi diagram is enriched by adding edges equidistantly along and perpendicularly to long edges on ∂(P\H) as described above.

Double edges to concave corners may also be removed and the concave corner's bisector may be added instead (see description above).

The diagram VD is consisting of one cycle C and some trees growing out from C (see FIG. 8A). Each of the trees grows either outwards and has all its leaves on ∂P or inwards and has all its leafs on ∂H. It is desirable for the trees to be symmetric in the sense that there is a tree $PT_n$ with root n∈C and leafs on ∂P if and only if there is a tree $HT_n$ with root n and leafs on ∂H. If for a node n∈C, one only has one of the trees, say $HT_n$, an edge from node n is added to the closest point on ∂P and let $PT_n$ be the tree consisting of that single edge. It follows from the properties of the Voronoi diagram that the added edge does not intersect any of the other edges.

The cycle C is stored as a vector $[n_0, \ldots, n_{c-1}]$ of the nodes on C in counter-clockwise order, such that there are trees $HT_{n_i}$ and $PT_{n_i}$ for each i=0, ..., c−1. One lets $T_n = PT_n \cup HT_n$ be the union of the two trees rooted at node n∈C and consider $T_n$ as a tree rooted at node n.

Defining the Movement of the Wave

On each tree $T_n$, a wave model similar to the one described above is defined. The wave starts at time t=0 on the leafs on ∂H and moves through $T_n$ so that it hits the leafs on ∂P at time t=1. Once the time and speed in the node n is determined, the times and speeds on the other nodes and edges in $T_n$ are computed analogously to method 1 described above. One difference is that decreasing times are computed for the tree $H_n$. A way to do so is to set TimeN[n]←1−TimeN[n], compute the inverse times using method 1, and afterwards inverse each of the computed times t by setting t←1−t.

Let the preferred time of a node n be $$t_n = \frac{HoleHeight[n]}{BoundaryHeight[n] + HoleHeight[n]},$$

where BoundaryHeight[n] is the length of the longest path to a leaf in $PT_n$ and HoleHeight[n] is the length of the longest path to a leaf in $HT_n$. A naïve method to define the times and speeds of a root n is to set $$TimeN[n] \leftarrow t_n,$$

$$SpeedN[n] \leftarrow \frac{HoleHeight[n]}{TimeN[n]}$$

Figure 9A:
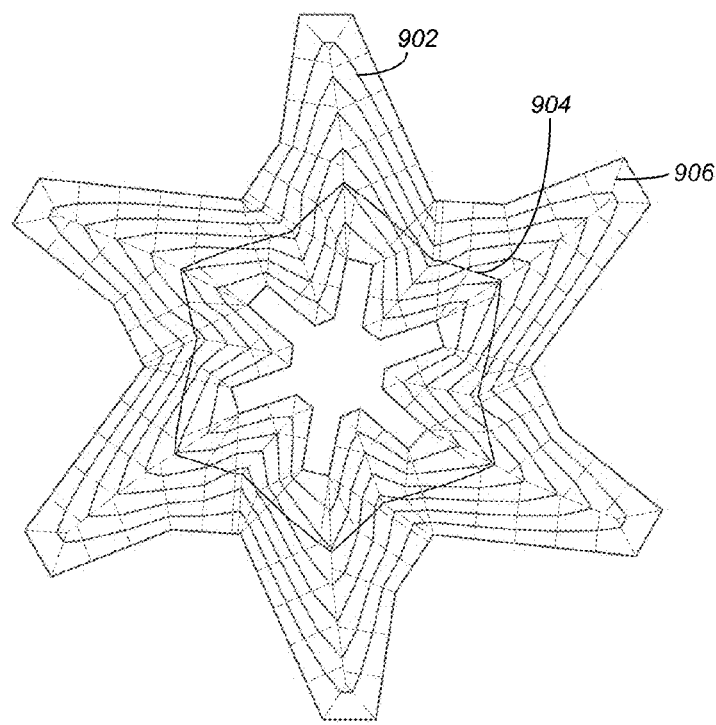
FIGS. 9A and 9B for a comparison of the wavefronts with and without smoothing in accordance with one or more embodiments of the invention.
Figure 9B:
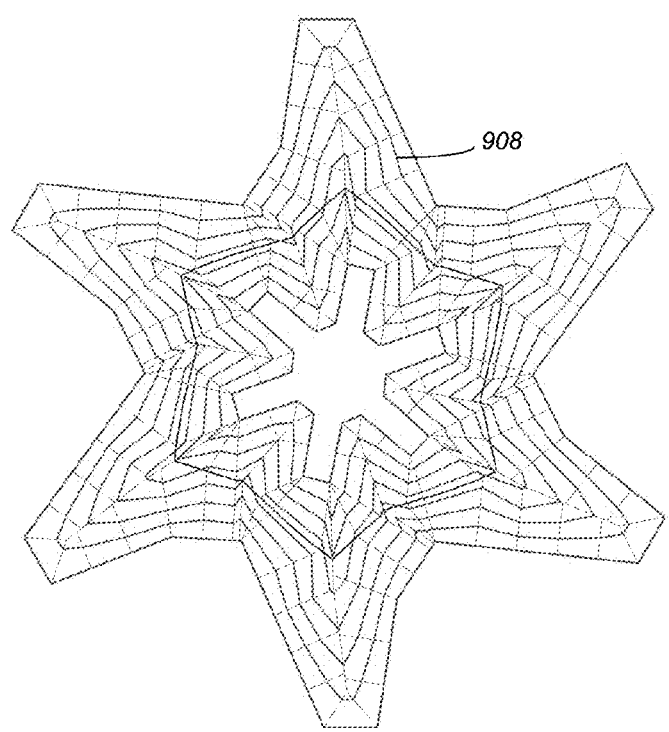

That will minimize the number of revolutions and give the most equidistant wavefronts on each tree $T_n$. However, the abrupt changes in time and speed along the cycle C results in a spiral that curves a lot. Instead, embodiments of the invention smooth the times and speeds around C. See FIGS. 9A and 9B for a comparison of the wavefronts with and without smoothing. FIG. 9A illustrate wavefronts 902 when the times and speeds of the wave in the root nodes have been smoothed around the cycle C 904, and VD 906. FIG. 9B illustrates wavefronts 908 when a naïve approach has been used to define times and speeds of the root nodes. There might be many ways of smoothing the values. After experimentation, one may find the following to give good results.

Let the time for a node n EC be a weighted average of its neighbours' preferred times. An influence distance InflDist [n] of each root node n∈C, is defined as the distance along C in which n has influence on the times and speeds of other root nodes. In most real-world instances, the majority of the trees $T_n$ consist of just two edges, namely one going to P and one to H, and these two edges are almost equally long. These to edges should have zero influence distance, so that they only have an influence on their own times. Accordingly, a positive influence distance is given if and only if one of the trees $HT_n$ and $PT_n$ have more than one leaf or the ratio $$\frac{HoleHeight[n]}{BoundaryHeight[n]}$$

is not in the interval [1/1.02, 1.02].

When the influence distance should be positive, it may be defined in the following way: Consider three consecutive leafs $l_1$, $l_2$, and $l_3$ of VD on $\partial P$ or $\partial H$. The spanned boundary of $l_2$ is defined to be the path $[M_1, Point[l_2], M_2]$, where $$M_1 = \frac{Point[l_1] + Point[l_2]}{2} \text{ and } M_2 = \frac{Point[l_2] + Point[l_3]}{2}.$$

The spanned boundary of a tree $PT_n$ is the union of all the spanned boundaries of the leafs of $PT_n$, similarly for $HT_n$. Let InflDist[n] be the maximum of the distances between the start- and endpoints of the spanned boundaries of $PT_n$ and $HT_n$.

To compute the times of the root nodes, a weight of a root node n∈C is defined as Weight[n]←HoleHeight[n]+BoundaryHeight[n]+32·InflDist[n]. If a node n with low weight or zero influence distance is very close (say, closer than 0.1δ) to a node m with a high weight (say, 5 times as much) and positive influence distance, better results may be experienced if one sets Weight[n]←0. In that way, the influential neighbour m completely dominates node n.

Consider two root nodes n and m where m has positive influence distance and the path from m to n on C has length d≤InflDist[m]. The weight of node m on node n may be defined as $w_m = x_m^3 \cdot$Weight[m], where $$x_m = 1 - \frac{d}{InflDist[m]},$$

i.e., the weight decreases cubically as the distance increases. The time at node n is defined as $$TimeN[n] \leftarrow \frac{\Sigma_m w_m t_m}{\Sigma_m w_m}.$$

Here, the sums are over all nodes m where n is within the influence distance of m.

As for the speed, it may be seen that the speed at node n should at least be $$v_n = \max\left\{\frac{HoleHeight[n]}{TimeN[n]}, \frac{BoundaryHeight[n]}{1 - TimeN[n]}\right\},$$

so that the wave can reach $\partial H$ at time 0 and $\partial P$ at time 1. The speed may be defined as $$SpeedN[n] \leftarrow \max_m \{v_m \cdot x_m^2 \cdot (1 - |TimeN[n] - TimeN[m]|)\},$$

where the maximum is over all the nodes m such that n is within the influence distance of m. The value $x_m$ is defined above. The last factor in the expression is to reduce the influence from nodes that have gotten a very different time than node n, since the speeds of the wave become less comparable when the times are different.

Creating Wavefronts

For a given root node n∈C, one wants at least $$S_{H_n} = \frac{HoleHeight[n]}{\delta'}$$

revolutions of the spiral in the tree $HT_n$ in order to respect the stepover $\delta' = 0.95 \cdot \delta$. Similarly, one wants $$S_{P_n} = \frac{BoundaryHeight[n]}{\delta'}$$

revolutions in $PT_n$. Therefore, the time between two revolutions should be at most $$\Delta_n = \min\left\{\frac{TimeN[n]}{S_{H_n}}, \frac{1 - TimeN[n]}{S_{P_n}}\right\}.$$

Hence, one may let $\Delta' = \min_{n \in C}\{\Delta_n\}$ be the minimum over all such values. One lets the number of revolutions be $r = \lceil 1/\Delta' \rceil$ and sets $\Delta = 1/r$.

Each tree $T_n$ contains a contiguous subset of the corners of a wavefront i. The corners of the subset are points on $HT_n$ if and only if t≤TimeN[n], otherwise they are on $PT_n$. Let $$r_{H_n} = \left\lfloor \frac{TimeN[n]}{\Delta} \right\rfloor.$$

The wavefronts i=0, . . . , $r_{H_n}$ are on $HT_n$, while wavefronts i=$r_{H_n}$+1, . . . , r are on $PT_n$. The wavefronts may be stored in a two-dimensional array for each of the trees $HT_n$ and $PT_n$. The wavefront corners on $HT_n$ of one wavefront are stored in an array HoleWavefront[n][j], where index j corresponds to wavefront i=$r_{H_n}$−j+1. In $PT_n$, the array BoundaryWavefront[n][j] stores corners of wavefront i=j+$r_{H_n}$. In $HT_n$, the parents of the corners of wavefront i=0, . . . , $r_{H_n}$−1 are corners of wavefront i+1. In $PT_n$, the parents of the corners of wavefront i=$r_{H_n}$+2, . . . , r are corners of wavefront i−1. Therefore, all parents are on the wavefront one step closer to the root n. In both $HT_n$ and $PT_n$, fake wavefront corners are introduced at node n stored in the arrays HoleWavefront[n][0] and BoundaryWavefront[n][0], respectively, which are the parents of the corners in the arrays HoleWavefront[n][1] and BoundaryWavefront[n][1]. Thus, these fake corners are not corners on wavefront i for any i=0, . . . , r, but are merely made to complete the tree of parent pointers between corners of neighbouring wavefronts.

One may also need an array WavefrontLength containing global information about the length of each wavefront crossing all the trees $\{T_n\}_n$ in order to do interpolation between the wavefronts later.

Interpolating Between Wavefronts

An interpolated revolution between two wavefronts may be added to the existing wavefronts. In this regard, one interpolates between two wavefronts i−1 and i in each tree $T_n$ separately. If i≤$r_{H_n}$, one interpolates between the wavefront fragments stored in HoleWavefront[n][j] and Hole- Wavefront[n][j+1], where j=$r_{H_n}$−i+1, using the values of the length of wavefront i−1 stored in WavefrontLength[i−1]. If i>$r_{H_n}$+1, one interpolates between BoundaryWavefront[n][j−1] and BoundaryWavefront[n][j], where j=i−$r_{H_n}$, using the values stored in WavefrontLength[i]. A special case occurs when i=$r_{H_n}$+1, i.e., when the interpolation is between the first wavefront on each side of the root node n. Let $$t = (i-1)\Delta + \frac{WavefrontLength[i][m]}{TotalWavefrontLength}\Delta,$$

where m is the index of the wavefront corner BoundaryWavefront[n][1][0] in wavefront i. If t≤TimeN[n], the interpolation is between HoleWavefront[n][0] and HoleWavefront[n][1]. Otherwise, the interpolation is on the other side of C, that is, between BoundaryWavefront[n][0] and BoundaryWavefront[n][1]. The convexification process described above can be used in each tree $T_n$ separately.

Before the interpolated revolution of wavefront 0 and 1 is added, wavefront 0 may be added to Spiral, i.e., all the corners on ∂H. Likewise, after the final revolution between wavefronts r−1 and r, wavefront r is added, which is all the corners on ∂P. These are used to ensure that the distance from the first and last revolution to ∂H and ∂P, respectively, do respect the stepover when rounding the spiral.

It is desirable for all of the Parent pointers to be towards the hole H. Therefore, for each tree $HT_n$, all the pointers between wavefronts HoleWavefront[n][j] and HoleWavefront[n][j+1] for j≥1 are reversed. Every wavefront corner in HoleWavefront[n][1] is made the parent of every wavefront corner in Boundary Wavefront[n][1] to splice out the fake wavefront at node n.

Figure 10A:
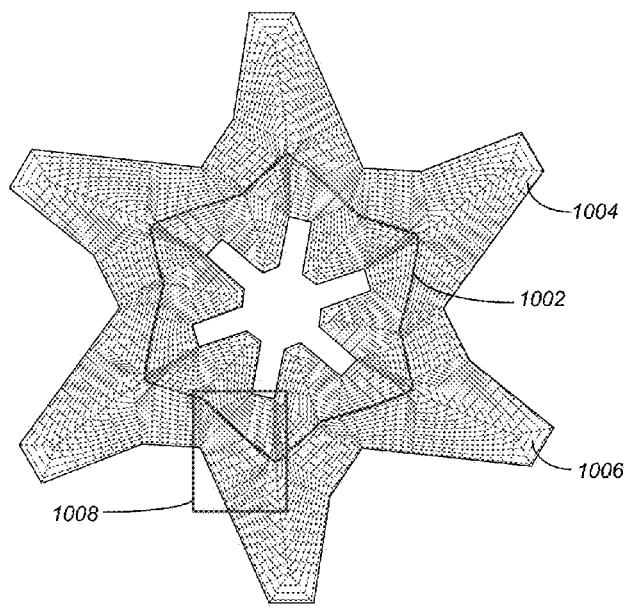
FIGS. 10A, 10B, and 10C illustrate the same hole and boundary as in FIGS. 8A and 8B with additional interpolation and smoothing in accordance with one or more embodiments of the invention.
Figure 10B:
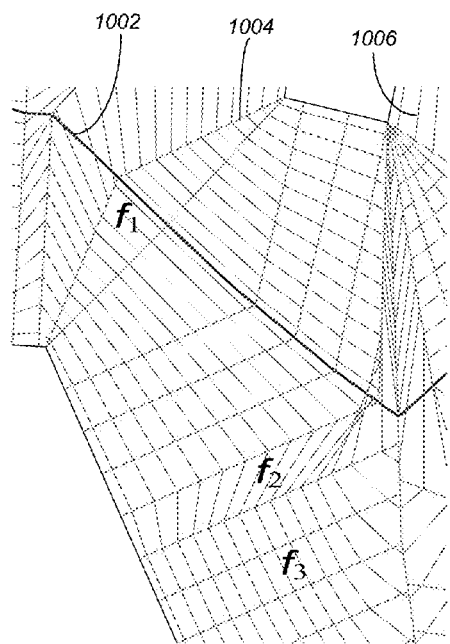
Figure 10C:
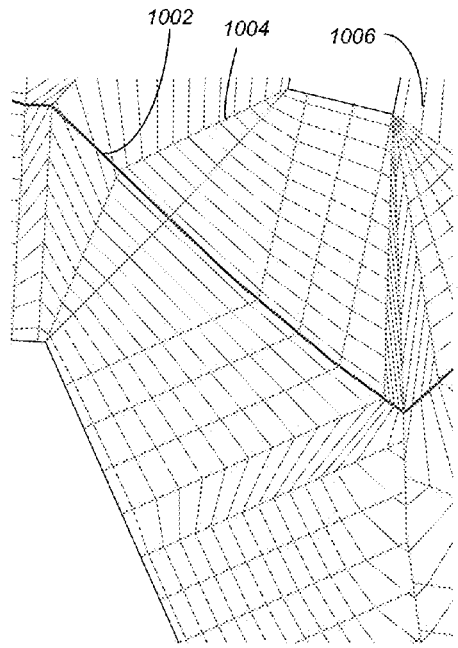

Lemma 3 uses the fact that there are no intersections between different wavefronts to conclude that the polyline spiral has no self-intersections. When there is a hole H in P, there are two kinds of faces into which VD subdivides P\H. In this regard, FIGS. 10A, 10B, and 10C illustrate the same hole and boundary as in FIGS. 8A and 8B. FIGS. 10A, 10B, and 10C depict the cycle 1002, edges of VD 1004, and the interpolated spiral 1006. The times around C have not been smoothed, but the preferred time of each node (as described above) has been used to emphasize the intersection problems that can arise. FIG. 10B illustrates a close-up of FIG. 10A of area 1008. FIG. 10C illustrates the introduction of new corners on C when the spiral jumps from one side of C to the other when the union of the two faces on each side of C is not convex.

Some faces, like $f_3$ in FIG. 10B are bounded by edges of one tree $T_n$ while some are between two trees, like $f_1$ and $f_2$. The latter kind is bounded by edges of two neighbouring trees $T_n$ and $T_m$ and an edge e from n to m on C, where n and m are neighbouring nodes on C. The first kind of faces is similar to the faces described above, so there is no need to worry about self-intersections of the spiral. The second, however, can lead to wavefronts crossing each other and therefore also a self-intersecting spiral, as is the case in FIG. 10B when the spiral jumps over C and crosses $f_2$. If the union of the faces on each side of e is convex, like $f_1$ and its neighbouring face is on the other side of C, there is no problem. It can easily be tested if the union of the faces is convex by considering the angles of the union at nodes n and m. If it is not convex, a new corner is introduced on the edge on C whenever the spiral jumps from one side of C to the other when crossing the faces. The new corner is an interpolation of nodes n and m using the time of the spiral in the last corner in tree $T_n$. FIG. 10C shows the result of introducing the extra corners.

Alternative Spiral in Simply-Connected Pockets

The method described above (in section entitled "Basic Spiral Construction") is mainly applicable if the polygon P is not too far from being a circle. If P is very elongated or branched, the distance between neighbouring revolutions will often be much less than the maximum stepover. Therefore, the toolpath will be unnecessarily long and the cutting width will vary a lot. That leads to long machining time and an uneven finish of the part.

Figure 11A:
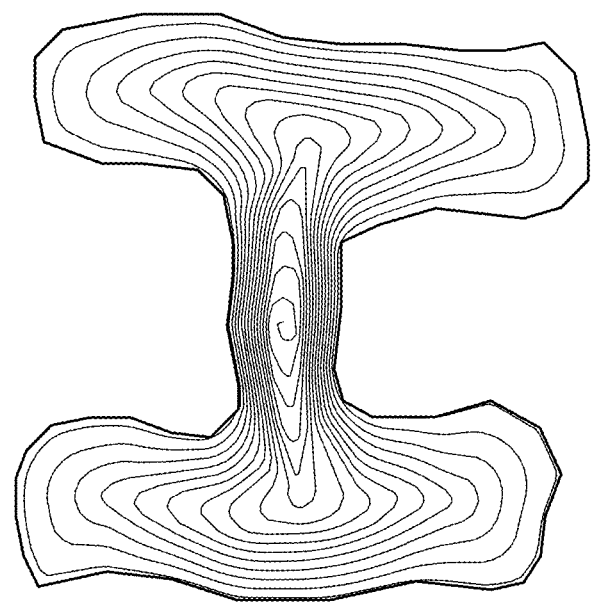
FIGS. 11A and 11B illustrate a comparison of the basic spiral method (FIG. 11A) with the improved skeleton method (FIG. 11B) when applied to the same polygon in accordance with one or more embodiments of the invention.
Figure 11B:
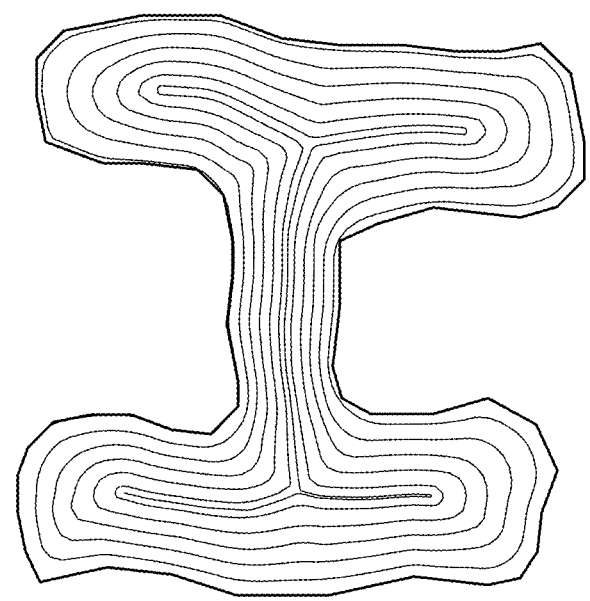

In cases where the Polygon P is not a circle, a skeleton may be constructed in P, which is a hole H with zero area. The method described above may then be used to make a spiral from the hole to the boundary. It does not matter for the construction of the spiral that the hole H has zero area. FIGS. 11A and 11B illustrate a comparison of the basic spiral method (FIG. 11A) with the improved skeleton method (FIG. 11B) when applied to the same polygon in accordance with one or more embodiments of the invention. Note that the spiral obtained from the skeleton method is significantly shorter and that the distance between neighbouring revolutions is varying much less than when using the basic method.

Constructing the Skeleton in a Polygon P

The skeleton is a connected subset of the edges of the diagram VD=VD(P). VD is traversed once starting at the root and for each edge, a decision is made whether to include the edge in the skeleton. If an edge from node n to m is not included, it is not in the tree VD[m]. For any node n, let d(n) be the length of the shortest path from n to a leaf in VD[n], and let D=$\max_{n \in VD}$d(n). It may be found that the following criteria for including an edge e from node n to m gives good results. All the criterion may be required to be satisfied.

1. Node n is the root, the longest path from n to a leaf in VD[n] goes through m, or l[e]+Height[m]≥1.5·D.
2. The length of the spanned boundary of m is larger than 2·D.
3. Height[m]≥D.

Criterion 1 is to avoid getting a skeleton that branches into many short paths. Therefore, a branch that is not following the longest path from n is only made if it seems to become at least 0.5·D long (using criterion 3).

When criterion 2 fails, it seems to be a good indicator that an edge is not a significant, central edge in VD, but merely one going straight to the boundary. Criterion 3 ensures that one does not get too close to the boundary. If one gets too close to the boundary, very short distances between the neighbouring revolutions are obtained.

Figure 12A:
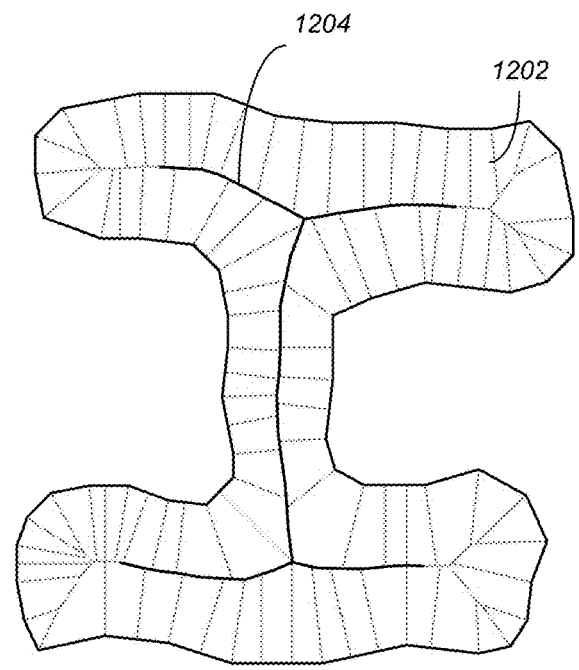
FIGS. 12A and 12B illustrate a constructed skeleton given the polygon from FIGS. 11A and 11B in accordance with one or more embodiments of the invention.
Figure 12B:
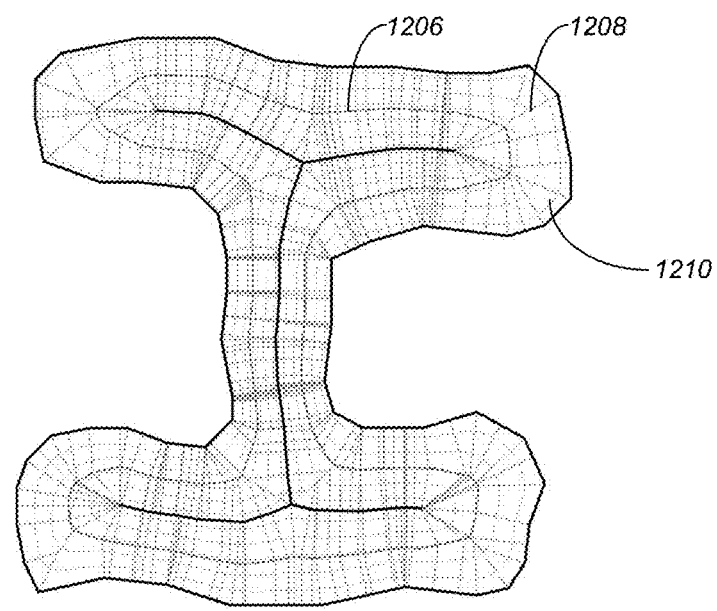

If criterion 3 is the only failing criterion, the point p on e is found such that Height[m]+‖p−Point[m]‖=D and the edge from node n top is included in the skeleton. FIGS. 12A and 12B illustrate the skeleton constructed given the polygon from FIGS. 11A and 11B. In particular, FIG. 12A illustrates the diagram VD(P) 1202 of the polygon P from FIGS. 11A and 11B, where the edges chosen for the skeleton are indicated at 1204. FIG. 12B illustrates the diagram VD(P\H) of P with the skeleton considered a hole H, with cycle C 1206, and remaining edges 1208. The resulting spiral from FIG. 11B is indicated as spiral 1210.

If the polygon is close to being a circle, the method described here results in a very small skeleton, and a better spiral is obtained using the basic method described above in that case. Determining if the polygon is too close to a circle can be tested automatically by falling back to the basic method if the circumference of the skeleton is less than, say, 5% of the circumference of P. In other words, a skeleton is constructed and if the circumference of the skeleton is less than 5% of the circumference of P, the polygon is deemed too close to being a circle, and the basic spiral construction method is utilized.

Construction of Spiral Around Multiple Holes

Figure 13A:
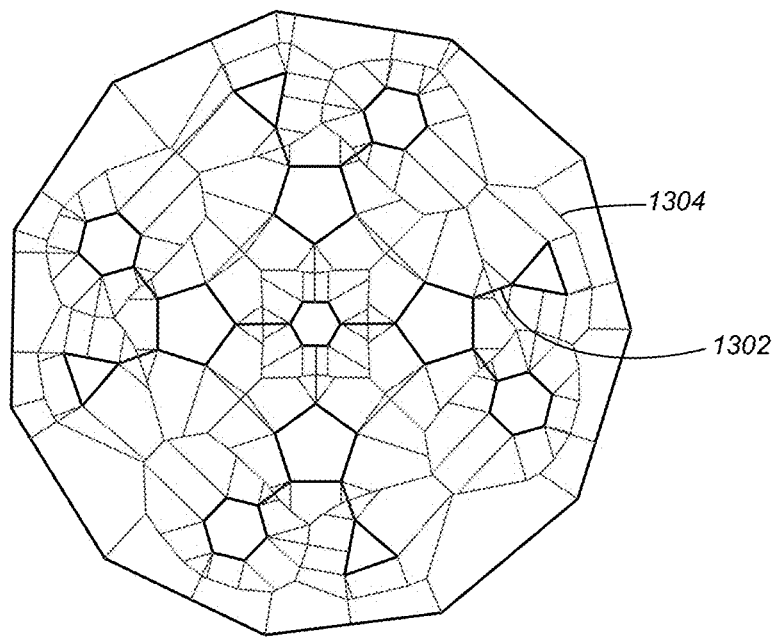
FIGS. 13A and 13B illustrate the connection of bridges in a tree structure to form one big hole in accordance with one or more embodiments of the invention.
Figure 13B:
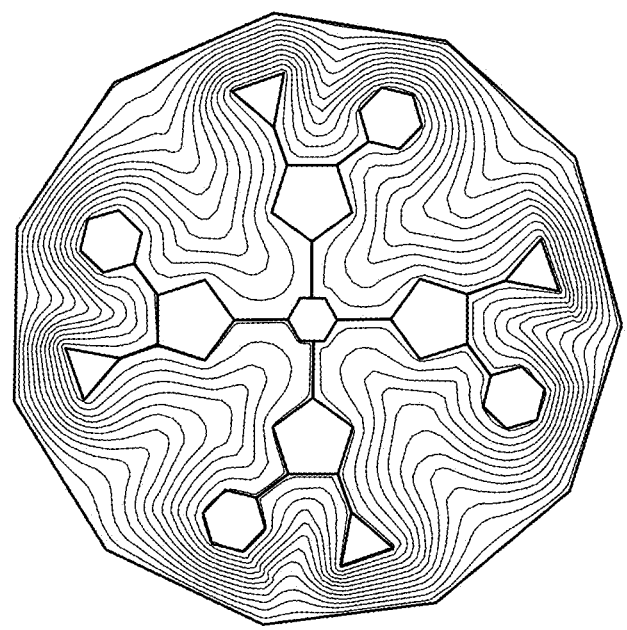

The method described above (i.e., in the section "Spiral Construction Adapted to a Pocket with One Hole") works only for polygons with a single hole. If there are many holes $H_0, \ldots, H_{h-1}$ in a polygon P, one may simply connect them with bridges in a tree structure to form one big hole. FIGS. 13A and 13B illustrate the connection of bridges in a tree structure to form one big hole in accordance with one or more embodiments of the invention. FIG. 13A illustrates a polygon with 13 holes. The bridges chosen among the Voronoi edges to connect the holes are indicated at 1302 and the remaining edges are indicated at 1304. FIG. 13B illustrates the resulting spiral around the holes.

The method for computing the spiral is given in Method 3 below.

---

Method 3: MakeBridges(P, $H_0, \ldots, H_{h-1}$)

1   Compute the Voronoi diagram V of the area inside P but outside every $H_i$.
2   Find the set of all nodes N of V which are either a corner on a hole
or equally close to two holes but farther from ∂P.
3   Let $n_0$ be the node in N closest to the root of VD(P)
4   Let s[n] ← FALSE for each node n ∈ V .
5   Let d[n] ← ∞ for each node n ∈ V .
6   s[$n_0$] ← TRUE; d[$n_0$] ← 0
7   bridges ← [ ]
8   while s does not include every hole do
9   For each node n, if s[n] = FALSE, set d[n] = ∞.
10  Let p[n] = NULL for each node n.
11  Let Q be a priority queue of the nodes n of V sorted after the values
d[n].
12  while Q ≠ ϕ do
13  Let n be the front node in Q and remove n from Q.
14  if n is a corner on a hole $H_i$ and s[n] = FALSE
15  For each node n' on the path n, p[n], p[p[n]], . . . , set
s[n'] ← TRUE.
16  Add each edge on the path n, p[n], p[p[n]], . . . to
bridges.
17  Let $n_f$ be the node on $H_i$ farthest from n and let a ← ||$n_f$
 − n||.
18  For each node n' on $H_i$, set d[n'] ← d[n] + a and s[n']
← TRUE.
19  Go to line 8.
20  For each edge going out of n to a node n' ∈ V, if s[n'] =
FALSE and d[n] + ||n − n'|| < d[n'], set d[n'] ← d[n] + ||n − n'||, update
Q
accordingly, and set p[n'] ← n.

--- the bridges are chosen as edges in the Voronoi diagram V of the area P\$U_{i=0}^{h-1}H_i$. Method 3 creates an array bridges of the edges to use as bridges. A growing set s of the nodes of the Voronoi diagram that we have connected by bridges so far are kept. Here, s is represented as a bit-vector. One central node $n_0$ is found and s only contains $n_0$ in the beginning. Dijkstra's method [4] is used in the loop beginning at line 12 to make all shortest paths from nodes in s until a hole $H_i$ is reached whose corners are not in s. The shortest path to that hole is used as a bridge and the nodes are added on the shortest path and the corners on $H_i$ to s. The use of the distance vector d makes Method 3 prefer to build bridges from the vertices that has been in s for the longest time. That makes the bridges grow from the center node $n_0$ out in every direction instead of creating dead ends that would require many revolutions to fill out by the spiral.

VRONI by Held [7] has the possibility to add edges to the Voronoi diagram between neighboring objects in the input where the distance between the objects is shortest, even though these are not genuine Voronoi edges. It is an advantage also to consider these edges when choosing the bridges between the holes, since they are often the best bridges. For instance, all the bridges chosen in the example of FIGS. 13A-13B are of that kind.

Logical Flow

Figure 14:
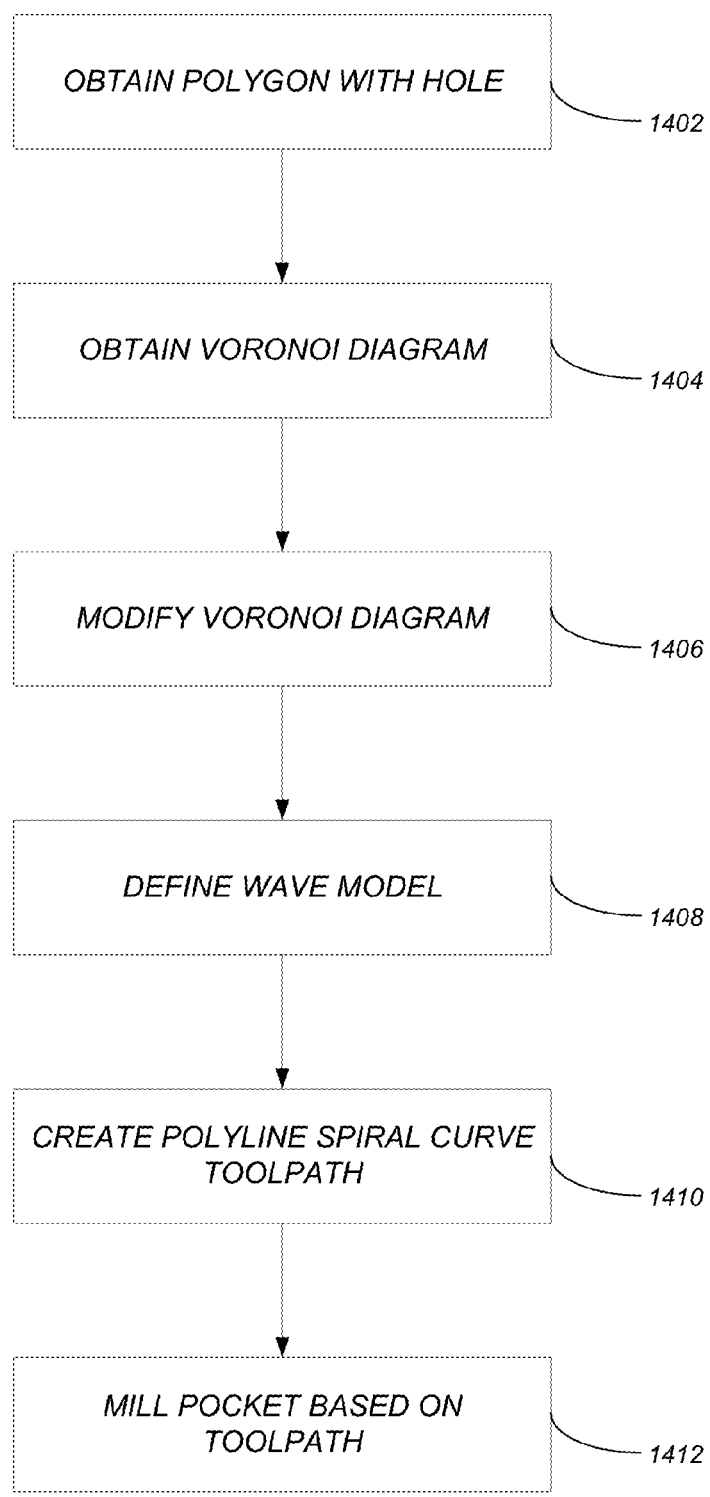
FIG. 14 illustrates the logical flow for constructing a spiral toolpath for machining solid material in accordance with one or more embodiments of the invention.

FIG. 14 illustrates the logical flow for constructing a spiral toolpath for machining solid material in accordance with one or more embodiments of the invention.

At step 1402, a polygon P with a polygonal hole H in an interior of P is obtained. In embodiments of the invention, once a polygon has been obtained/acquired/constructed, if there is no hole and the polygon is too far from being a circle (e.g., it is very elongated or branched), a skeleton may be constructed in the polygon. Such a skeleton may be the polygonal hole H with zero area. Alternatively, if the polygon has multiple holes, the multiple holes may be connected with bridges in a tree structure to form one big hole.

At step 1404, a Voronoi diagram of a set of line segments of P and H is obtained.

At step 1406, the Voronoi diagram is modified to provide a modified Voronoi diagram (VD), wherein the VD comprises a cycle C having one or more trees growing out from C. In one or more embodiments, VD is a connected plane graph contained within P\H (the set of points that are in the interior or on the boundary of P but not in the interior of H), each leaf of VD is on the boundary of P or H, there is at least one leaf of VD on each corner of P and H, all faces into which VD divides P\H are convex, and VD contains exactly one cycle, wherein the one cycle is the locus of all points being equally close to the boundary of H and the boundary of P, and H is contained in the one cycle's interior. The modification of the Voronoi diagram may include adding edges equidistantly along and perpendicularly to long edges on a boundary of P\H (the set of points that are in the interior or on the boundary of P but not in the interior of H). Alternatively or in addition, double edges to concave corners of P may be removed, and a bisector of the concave corners may be added from the concave corners to the Voronoi diagram.

At step 1408, for each of the one or more trees, a wave model is defined for a wave that starts at time t=0 on leaves on the boundary of H and moves through the tree to hit leaves on the boundary of P at time t=1. The wave model may be defined by computing a first time and first speed of the wave from a first node of a first tree of the one or more trees, and based on the first time and the first speed, computing additional times and additional speeds of additional nodes of the first tree. For trees based on H, decreasing times may be computed. Further, the additional times and additional speeds may be smoothed around C.

Within step 1408, one or more wavefronts for the wave model may be constructed by defining a number of revolutions of the polyline spiral curve toolpath to be performed. The number of revolutions respects a user defined stepover for a width of material to be cut away. Further, a revolution between two of the wavefronts may be interpolated to ensure that the user defined stepover is respected when the polyline spiral curve toolpath is rounded.

At step 1410, a polyline spiral curve toolpath is created by travelling around the wave as it moves towards the boundary of P. The creation of the toolpath may include rounding of the polyline spiral curve toolpath to obtain a tangent continuous spiral curve that consists of line segments and circular arcs (ensuring that the defined stepover is respected).

At step 1412, a pocket is milled in a solid piece of material by following the polyline spiral curve toolpath.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the present invention provide methods for the computation of spiral toolpaths suitable for many shapes of pockets for which no previously described methods yield equally good results. In particular, embodiments of the invention provide a spiral that morphs a hole in a pocket to the boundary of the pocket (based on polygonal input). Embodiments of the invention may also generalize the input to line segments and circular arcs, as done by Held and Spielberger [9], using ArcVRONI by Held and Huber [8] to compute the Voronoi diagrams for such input. The modification of the Voronoi diagram, where double edges to concave corners in the Voronoi diagram are substituted by their bisector, makes the diagram VD resemble the straight skeleton of the pocket [1]. Indeed, embodiments of the invention are well defined when using the straight skeleton instead of the Voronoi diagram.

Held and Spielberger [10] developed methods to subdivide a pocket with arbitrarily many holes into simply-connected sub-pockets, each of which are suitable for basic spirals. Since embodiments of the invention provide the ability to make spirals around holes, the input never has to be partitioned into separate areas, but in some cases, for instance if the pocket has a long "arm" requiring a lot of revolutions, it might be useful to machine different areas of the input independently.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] O. Aichholzer, F. Aurenhammer, D. Alberts, and B. Grtner. A novel type of skeleton for polygons. *Journal of Universal Computer Science*, 1(12):752-761, 1995.

[2] A. Banerjee, H.-Y. Feng, and E. V. Bordatchev. Process planning for floor machining of 2½D pockets based on a morphed spiral tool path pattern. *Computers & Industrial Engineering*, 63(4):971-979, 2012.

[3] M. B. Bieterman and D. R. Sandstrom. A curvilinear tool-path method for pocket machining. *Journal of Manufacturing Science and Engineering, Transactions of the ASME*, 125(4):709-715, 2003.

[4] E. W. Dijkstra. A note on two problems in connection with graphs. *Numerische Mathematik*, 1(1):269-271, 1959.

[5] R. L. Graham and F. F. Yao. Finding the convex hull of a simple polygon. *Journal of Algorithms*, 4(4):324-331, 1983.

[6] G. Y. Handler. Minimax location of a facility in an undirected tree graph. *Transportation Science*, 7(3):287-293, 1973.

[7] M. Held. Vroni: An engineering approach to the reliable and efficient computation of voronoi diagrams of points and line segments. *Computational Geometry*, 18(2):95-123, 2001.

[8] M. Held and S. Huber. Topology-oriented incremental computation of voronoi diagrams of circular arcs and straight-line segments. *Computer Aided Design*, 41(5):327-338, 2009.

[9] M. Held and C. Spielberger. A smooth spiral tool path for high speed machining of 2D pockets. *Computer-Aided Design*, 41(7):539-550, 2009.

[10] M. Held and C. Spielberger. Improved spiral high-speed machining of multiply-connected pockets. *Computer-Aided Design and Applications*, 11(3):346-357, 2014.

[11] J. L. Huertas-Talón, C. García-Hernández, L. Berges-Muro, and R. Gella-Marín. Obtaining a spiral path for machining STL surfaces using non-deterministic techniques and spherical tool. *Computer-Aided Design*, 50:41-50, 2014.

What is claimed is:

1. A computer-implemented method for constructing a spiral toolpath for machining solid material, comprising:
    obtaining a polygon P with a polygonal hole H in an interior of P;
    obtaining a Voronoi diagram of a set of line segments of P and H;
    modifying the Voronoi diagram to provide a modified Voronoi diagram (VD), wherein:
        the VD comprises a cycle C having one or more trees growing out from C;
        VD comprises a connected plane graph contained within P\H (a set of points that are in an interior or on a boundary of P but not in an interior of H);
        each leaf of VD is on a boundary of P or H;
        there is at least one leaf of VD on each corner of P and H;
        all faces into which VD divides P\H are convex; and
        VD contains exactly one cycle, wherein the one cycle is a locus of all points being equally close to a boundary of H and a boundary of P, and H is contained in the one cycle's interior;
    for each of the one or more trees, defining a wave model for a wave that starts at time t=0 on leaves on a boundary of H and moves through the tree to hit leaves on a boundary of P at time t=1;
    creating a polyline spiral curve toolpath by travelling around the wave as it moves towards the boundary of P, wherein the polyline spiral curve toolpath avoids and is around the hole H; and
    milling a pocket in a solid piece of material by following the polyline spiral curve toolpath.

2. The computer-implemented method of claim 1, wherein the modifying comprises:
    adding edges equidistantly along and perpendicularly to edges on a boundary of P\H (a set of points that are in an interior or on a boundary of P but not in an interior of H).

3. The computer-implemented method of claim 1, wherein the modifying comprises:
    removing double edges to concave corners of P; and
    adding a bisector of the concave corners from the concave corners to the Voronoi diagram.

4. The computer-implemented method of claim 1, wherein the defining the wave model comprises:

computing a first time and first speed of the wave from a first node of a first tree of the one or more trees;

based on the first time and the first speed, computing additional times and additional speeds of additional nodes of the first tree.

5. The computer-implemented method of claim 4, wherein for one of the one or more trees based on H, decreasing times are computed.

6. The computer-implemented method of claim 4, further comprising smoothing the additional times and additional speeds around C.

7. The computer-implemented method of claim 1, further comprising:

creating one or more wavefronts for the wave model by defining a number of revolutions of the polyline spiral curve toolpath to be performed, wherein the number of revolutions respects a user defined stepover for a width of material to be cut away.

8. The computer-implemented method of claim 7, further comprising:

interpolating a revolution between two of the wavefronts to obtain the polyline spiral curve toolpath.

9. The computer-implemented method of claim 7, wherein the creating the polyline spiral curve toolpath comprises:

rounding the polyline spiral curve toolpath to obtain a tangent continuous spiral curve consisting of line segments and circular arcs ensuring that the user defined stepover is respected.

10. The computer-implemented method of claim 1, wherein the obtaining the polygon P with the polygonal hole H in an interior of P comprises:

obtaining the polygon P; and constructing a skeleton in polygon P, wherein the skeleton comprises the polygonal hole H with zero area.

11. The computer-implemented method of claim 1, wherein the obtaining the polygon P with the polygonal hole H in an interior of P comprises:

obtaining the polygon P comprising multiple holes; and connecting the multiple holes with bridges in a tree structure to form one big hole.

12. A non-transitory computer readable storage medium encoded with computer program instructions which when accessed by a computer cause the computer to load the program instructions to a memory therein creating a special purpose data structure causing the computer to operate as a specially programmed computer, executing a method of constructing a spiral toolpath for machining solid material, comprising:

obtaining, in the specially programmed computer, a polygon P with a polygonal hole H in an interior of P;

obtaining, in the specially programmed computer, a Voronoi diagram of a set of line segments of P and H;

modifying, in the specially programmed computer, the Voronoi diagram to provide a modified Voronoi diagram (VD), wherein:

the VD comprises a cycle C having one or more trees growing out from C;

VD comprises a connected plane graph contained within P\H (a set of points that are in an interior or on a boundary of P but not in an interior of H);

each leaf of VD is on a boundary of P\H;

there is at least one leaf of VD on each corner of P and H;

all faces into which VD divides P\H are convex; and

VD contains exactly one cycle, wherein the one cycle is a locus of all points being equally close to a boundary of H and a boundary of P, and H is contained in the one cycle's interior;

for each of the one or more trees, defining, in the specially programmed computer, a wave model for a wave that starts at time t=0 on leaves on a boundary of H and moves through the tree to hit leaves on a boundary of P at time t=1;

creating, in the specially programmed computer, a polyline spiral curve toolpath by travelling around the wave as it moves towards the boundary of P, wherein the polyline spiral curve toolpath avoids and is around the hole H; and milling, via the specially programmed computer, a pocket in a solid piece of material by following the polyline spiral curve toolpath.

13. The non-transitory computer readable storage medium of claim 12, wherein the modifying comprises:

adding, in the specially programmed computer, edges equidistantly along and perpendicularly to edges on a boundary of P\H (a set of points that are in an interior or on a boundary of P but not in an interior of H).

14. The non-transitory computer readable storage medium of claim 12, wherein the modifying comprises:

removing, in the specially programmed computer, double edges to concave corners of P; and adding, in the specially programmed computer, a bisector of the concave corners from the concave corners to the Voronoi diagram.

15. The non-transitory computer readable storage medium of claim 12, wherein the defining the wave model comprises:

computing, in the specially programmed computer, a first time and first speed of the wave from a first node of a first tree of the one or more trees;

based on the first time and the first speed, computing, in the specially programmed computer, additional times and additional speeds of additional nodes of the first tree.

16. The non-transitory computer readable storage medium of claim 15, wherein for one of the one or more trees based on H, decreasing times are computed.

17. The non-transitory computer readable storage medium of claim 15, further comprising smoothing, in the specially programmed computer, the additional times and additional speeds around C.

18. The non-transitory computer readable storage medium of claim 12, further comprising:

creating, in the specially programmed computer, one or more wavefronts for the wave model by defining a number of revolutions of the polyline spiral curve toolpath to be performed, wherein the number of revolutions respects a user defined stepover for a width of material to be cut away.

19. The non-transitory computer readable storage medium of claim 18, further comprising:

interpolating, in the specially programmed computer, a revolution between two of the wavefronts to obtain the polyline spiral curve toolpath.

20. The non-transitory computer readable storage medium of claim 18, wherein the creating the polyline spiral curve toolpath comprises:

rounding, in the specially programmed computer, the polyline spiral curve toolpath to obtain a tangent continuous spiral curve consisting of line segments and circular arcs ensuring that the user defined stepover is respected.

21. The non-transitory computer readable storage medium of claim 12, wherein the obtaining the polygon P with the polygonal hole H in an interior of P comprises:
- obtaining, in the specially programmed computer, the polygon P; and
- constructing, in the specially programmed computer, a skeleton in polygon P, wherein the skeleton comprises the polygonal hole H with zero area.

22. The non-transitory computer readable storage medium of claim 12, wherein the obtaining the polygon P with the polygonal hole H in an interior of P comprises:
- obtaining, in the specially programmed computer, the polygon P comprising multiple holes; and
- connecting, in the specially programmed computer, the multiple holes with bridges in a tree structure to form one big hole.

* * * * *